United States Patent
Hayenga et al.

(10) Patent No.: US 12,248,174 B2
(45) Date of Patent: Mar. 11, 2025

(54) PHOTONIC INTEGRATED CIRCUIT AND LIGHT DETECTION AND RANGING SYSTEM

(71) Applicant: Intel Corporation, Santa Clara, CA (US)

(72) Inventors: William Hayenga, Los Angeles, CA (US); George Rakuljic, Santa Monica, CA (US); Eduardo Temprana Giraldo, Culver City, CA (US)

(73) Assignee: Intel Corporation, Santa Clara, CA (US)

( * ) Notice: Subject to any disclaimer, the term of this patent is extended or adjusted under 35 U.S.C. 154(b) by 658 days.

(21) Appl. No.: 17/471,218

(22) Filed: Sep. 10, 2021

(65) Prior Publication Data
US 2021/0405290 A1    Dec. 30, 2021

(51) Int. Cl.
*G02B 6/12* (2006.01)
*G01S 7/481* (2006.01)
(Continued)

(52) U.S. Cl.
CPC ........ *G02B 6/12007* (2013.01); *G01S 7/4816* (2013.01); *G01S 17/08* (2013.01); *G02B 6/12004* (2013.01); *G02B 2006/12138* (2013.01); *G02B 6/29346* (2013.01); *G02B 6/29395* (2013.01)

(58) Field of Classification Search
CPC ............ G02B 6/12007; G02B 6/12004; G01S 7/4816
See application file for complete search history.

(56) References Cited

U.S. PATENT DOCUMENTS 9,933,554 B2    4/2018  Santis et al.
2004/0120638 A1  6/2004  Frick
(Continued)

FOREIGN PATENT DOCUMENTS

WO    2021133445 A1    7/2021

OTHER PUBLICATIONS

International Search Report issued for the corresponding PCT patent application No. PCT/US2022/039764, dated Nov. 29, 2022, 4 pages (For informational purposes only).
(Continued)

*Primary Examiner* — Joseph L Williams
(74) *Attorney, Agent, or Firm* — VIERING, JENTSCHURA & PARTNER mbB

(57) ABSTRACT

A photonic integrated circuit including a semiconductor substrate having integrate a semiconductor light source configured to emit coherent light of at least the first wavelength and the second wavelength, the semiconductor light source having a first factor; a waveguide structure optically coupled to the semiconductor light source, the waveguide structure having a second Q factor that is higher than the first Q factor, the waveguide structure configured to form an optical cavity for at least the light of the first wavelength and the second wavelength; an optical output structure configured to optically couple the waveguide structure with a plurality of optical channels to transmit light of the first wavelength and the second wavelength from the waveguide structure to the plurality of optical channels.

23 Claims, 19 Drawing Sheets

(51) Int. Cl.
    *G01S 17/08*     (2006.01)
    *G02B 17/08*     (2006.01)
    *G02B 6/293*     (2006.01)

(56) References Cited

U.S. PATENT DOCUMENTS

| | | |
|---|---|---|
| 2006/0203864 A1 | 9/2006 | Jones |
| 2016/0261091 A1* | 9/2016 | Santis ................ H01S 5/1032 |
| 2018/0306925 A1 | 10/2018 | Hosseini et al. |
| 2020/0150240 A1 | 5/2020 | Huwer et al. |
| 2020/0401012 A1 | 12/2020 | Xu et al. |
| 2021/0018598 A1 | 1/2021 | Rakuljic |
| 2022/0342078 A1 | 10/2022 | Rakuljic et al. |

OTHER PUBLICATIONS

Harfouche, Mark et al., "Kicking the habit/semiconductor lasers without isolators", Optics Express, Nov. 23, 2020, 10 pages, vol. 20, Issue 24.

Provisional U.S. Appl. No. 62/954,012, filed Dec. 27, 2019.

International patent application No. PCT/US2021/34670 filed on May 28, 2021.

* cited by examiner

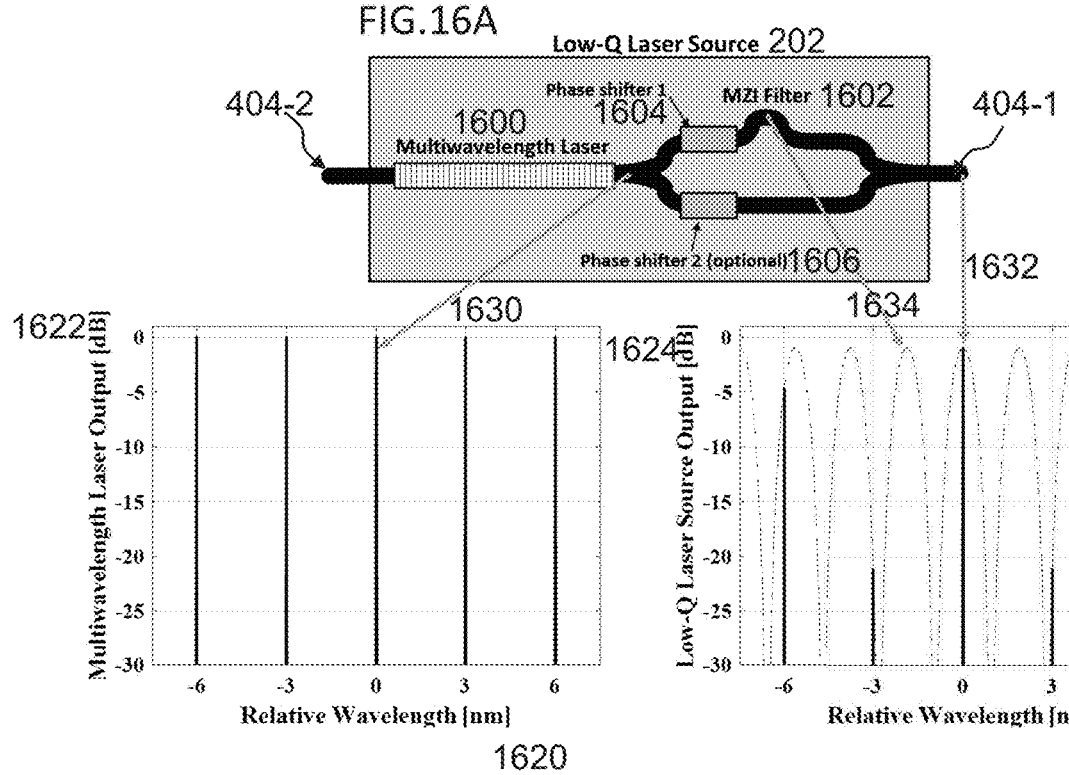

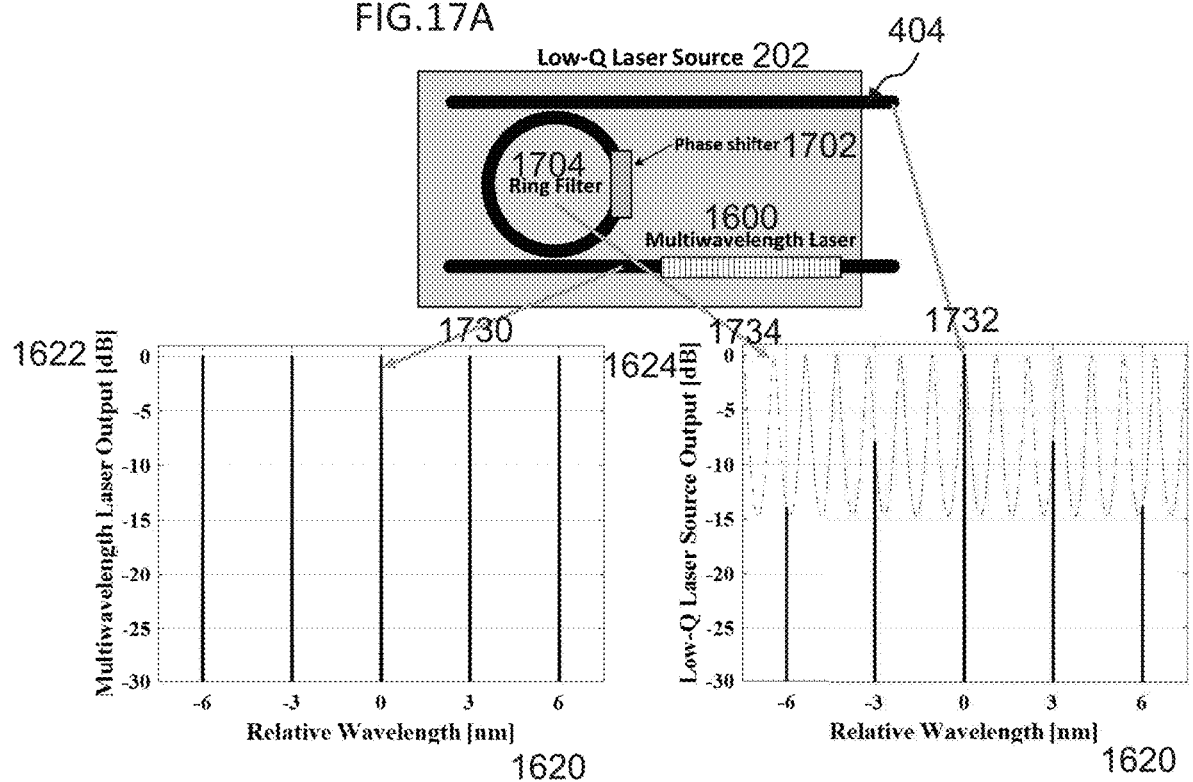

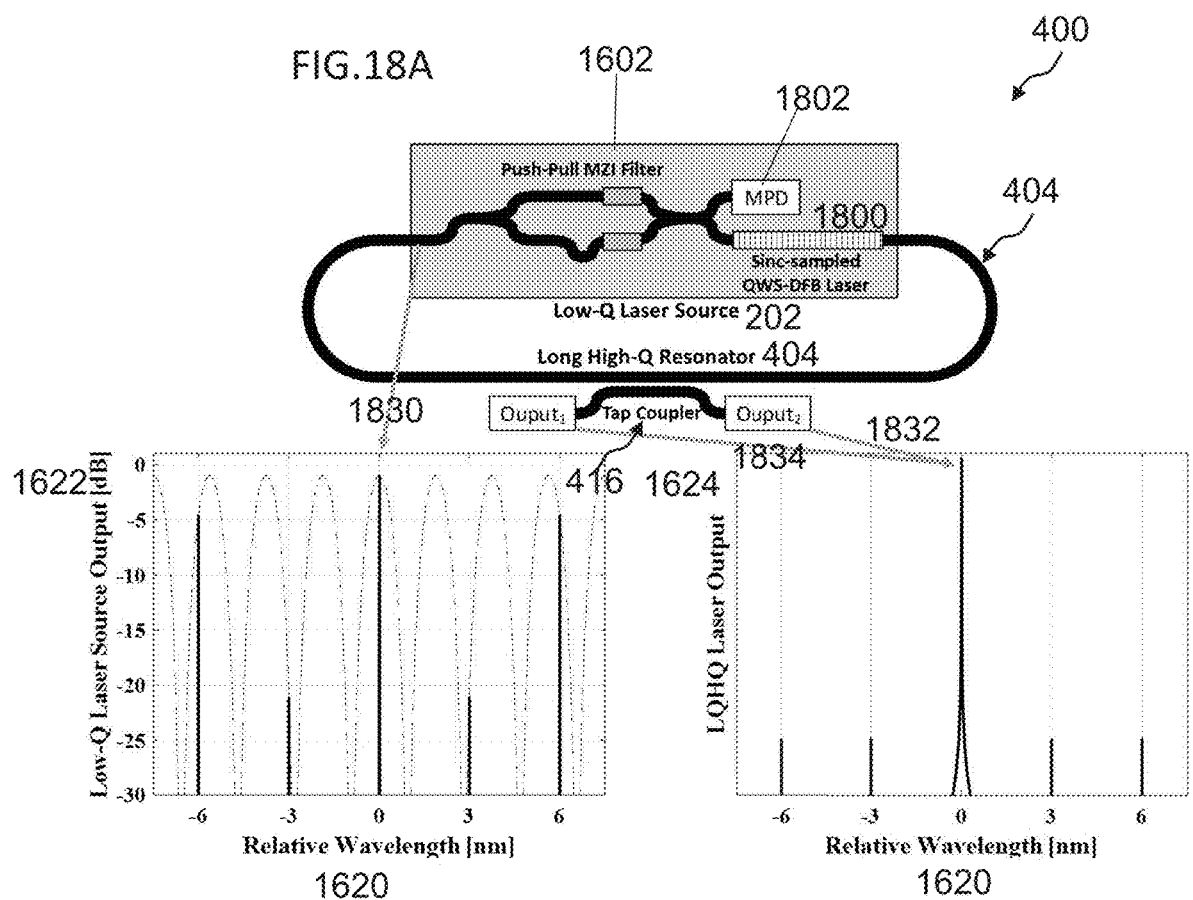

PHOTONIC INTEGRATED CIRCUIT AND LIGHT DETECTION AND RANGING SYSTEM

TECHNICAL FIELD

This disclosure generally relates to the field of light detection and ranging systems.

BACKGROUND

A Photonic Integrated Circuit (PIC) is desirable for coherent light detection and ranging (LIDAR) due to the promise of low cost and scalability to high volume. However, due to PIC limitations (size, yield, cost), the number of vertical channels (resolution elements) is limited (~10's). By using a multiple (M) wavelength laser source and a diffraction grating, for example, the number of LIDAR channels can be increased by a factor of M for a given PIC to achieve a desired high number (>100) of vertical resolution elements or pixels.

An ideal laser source for an integrated coherent LIDAR has a tunable (or switchable) output wavelength corresponding to the vertical scanning requirements of the coherent LIDAR system, low phase noise (optical linewidth), especially at low frequencies, for long-range detection of targets by the coherent LIDAR system, and high tolerance to optical feedback for integration with other coherent LIDAR components on a PIC without optical isolators. However, known laser sources cannot be integrated on a PIC since they require an optical isolator (which cannot be integrated) to achieve the necessary performance for a coherent LIDAR system. Thus, solutions based on a separate laser source and PIC are inferior in terms of optical efficiency, cost and fabrication ease.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which:

FIG. 10A to FIG. 19 illustrate diagrams of examples for LQHQ light sources.

DESCRIPTION

The following detailed description refers to the accompanying drawings that show, by way of illustration, specific details and aspects in which the invention may be practiced.

The term "as an example" is used herein to mean "serving as an example, instance, or illustration". Any aspect or design described herein as "as an example" is not necessarily to be construed as preferred or advantageous over other aspects or designs.

A source for coherent electromagnetic radiation for a light detection and ranging (LIDAR) system (the source here also denoted as light source or laser source) may be integrated on the semiconductor substrate of a photonic integrated circuit (PIC) of the LIDAR system. The light source may have a low Q factor (LQ) light emitting semiconductor structure and an optical cavity (also denoted as optical resonator or waveguide structure) having a high Q factor (HQ). The source may thus be denoted as LQHQ laser source throughout this specification. As an example, the LQHQ laser source may include an integrated semiconductor laser structure having a tunable low-Q laser source optically coupled to a long high-Q resonator. Typical low-Q for the LQHQ laser are $\sim 5\times 10^4$ and high-Q values are $\geq \sim 5\times 10^4$, respectively.

The LQHQ laser source may be configured for an integrated coherent LIDAR. The LQHQ laser source may be configured to have a tunable (or switchable) output wavelength corresponding to the vertical scanning requirements of the coherent LIDAR system, low phase noise (optical linewidth), e.g. at low frequencies, for long-range detection of targets by the coherent LIDAR system, and high tolerance to optical feedback for integration with other coherent LIDAR components on a PIC without optical isolators. Thus, an integrated semiconductor laser structure comprising a tunable low-Q laser source in a long high-Q resonator (the LQHQ laser) is provided. The tunable low-Q laser source is configured in accordance with the wavelength plan of the coherent LIDAR system and is dynamically set to the desired wavelength per control of the coherent LIDAR system. The long high-Q resonator enables the LQHQ laser's requisite narrow linewidth and optical feedback tolerance.

A coherent LIDAR system, e.g. implemented on a silicon (Si) PIC, can deliver the high performance and pricing demanded by customers for autonomous vehicle applications. The LQHQ laser source can substantially improve the optical efficiency, performance, cost, and fabrication ease of the product. Thus, an integrated semiconductor laser for coherent LIDAR having a narrow linewidth, being tunable, and being tolerant to optical feedback is provided.

Figure 1:
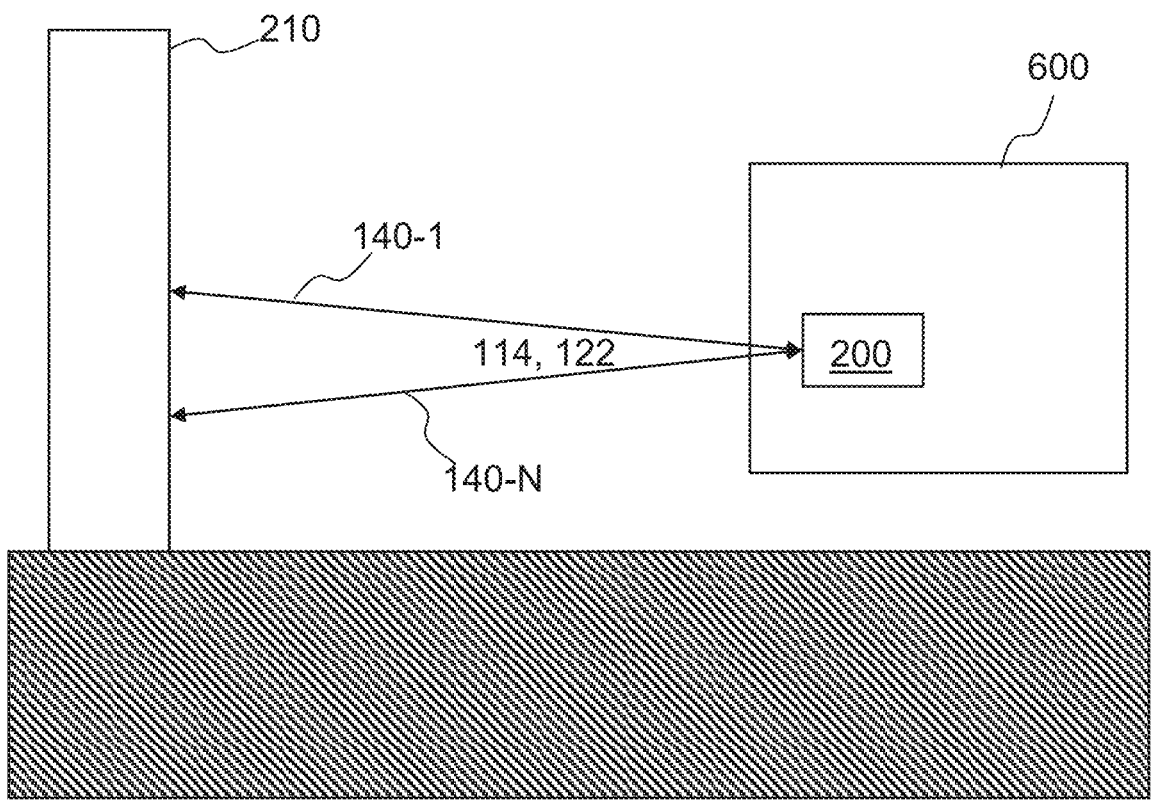
FIG. 1 illustrates a schematic diagram of a vehicle having a LIDAR system.

FIG. 1 illustrates a schematic diagram of a vehicle 600 having a LIDAR system 200 integrated therein, as an example. The vehicle 600 may be an unmanned/autonomous vehicle, e.g. unmanned/autonomous aerial vehicle, unmanned/autonomous automobile, or autonomous robot. In addition, LIDAR system 200 may be used in a mobile device such as a smartphone or tablet. The vehicle 600 may be an autonomous vehicle. Here, the LIDAR system 200 may be used to control the direction of travel of the vehicle 600. The LIDAR system 200 may be configured for obstacle, object depth or velocity detection outside of the vehicle 600, as an example. Alternatively or in addition, the vehicle 600 may require a driver or teleoperator to control the direction of travel of the vehicle 600. The LIDAR system 200 may be a driving assistant. As an example, the LIDAR system 200 may be configured for obstacle detection, e.g. determining a distance and/or direction and relative velocity of an obstacle (target 210) outside of the vehicle 600. The LIDAR system 200 may be configured, along one or more optical channels 140-i (with i being one between 1 to N and N being the number of channels of the PIC), to emit light 114 from one or more outputs of the LIDAR system 200, e.g. outputs of the light paths, and to receive light 122 reflected from the target 210 in one or more light inputs of the LIDAR system 200. The structure and design of the outputs and inputs of the light paths of the LIDAR system 200 may vary depending on the working principle of the LIDAR system 200. Alternatively, the LIDAR system 200 may be or may be part of a spectrometer or microscope. However, the working principle may be the same as in a vehicle 600.

Figure 2:
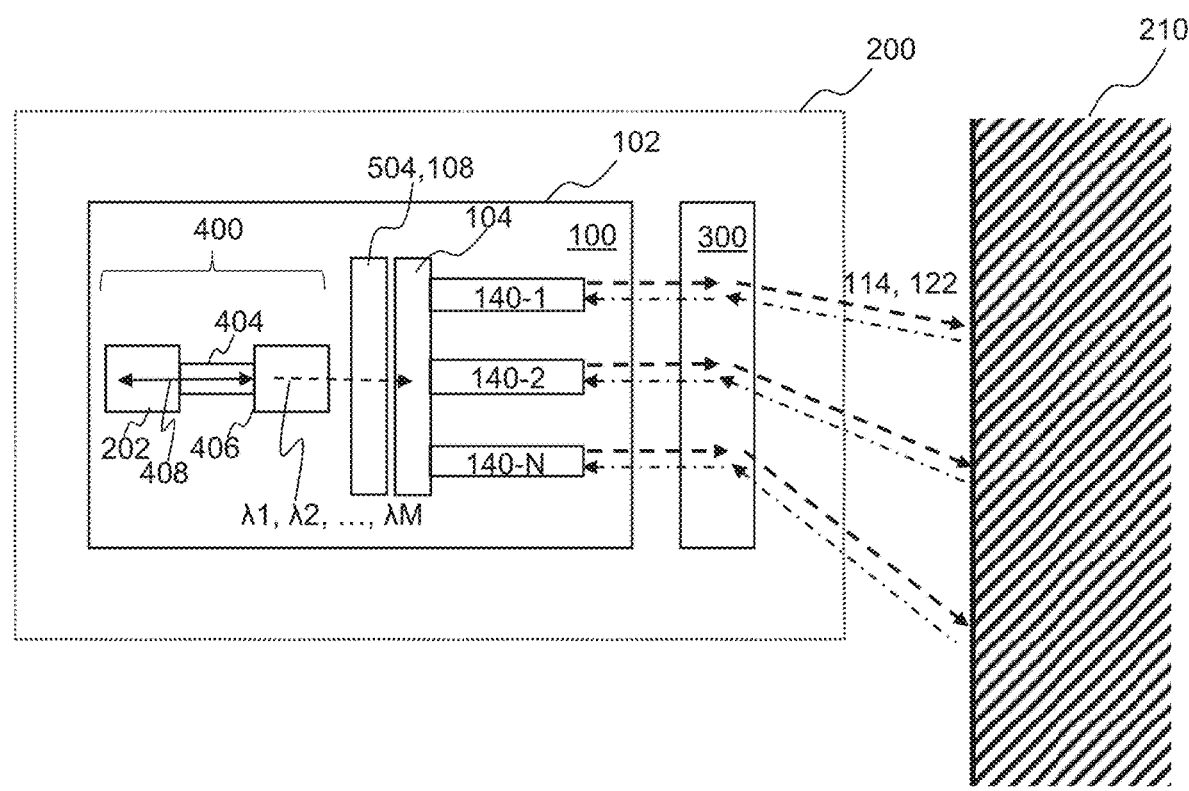
FIG. 2 illustrates a schematic diagram of a LIDAR system.

FIG. 2 illustrates a schematic diagram of a LIDAR system 200. The LIDAR system 200 includes photonic integrated circuit (PIC) 100 and an input/output structure 300 (also denoted as I/O structure or optical system) at least optically coupled to the PIC 100. Input/output structure 300 may also be integrated with photonic integrated circuit (PIC) 100 in a package or module, e.g. system in package (SIP) or system on module (SOM).

The photonic integrated circuit 100 may include a semiconductor photonic substrate 102. The semiconductor photonic substrate 102 may have integrated therein at least one light receiving input 104 to branch light received at the at least one light receiving input 104 to a first optical channel 140-1 and a second optical channel 140-2, e.g. of the plurality of optical channels 140-N.

The semiconductor photonic substrate 102 may be made of a semiconductor material, e.g. silicon. The semiconductor photonic substrate 102 may be common substrate, e.g. at least for the plurality of optical channels 140-N. The term "integrated therein" may be understood as formed from the material of the substrate and, thus, may be different to the case in which elements are formed, arranged or positioned on top of a substrate. The PIC includes a plurality of components located next to each other on the same (common) semiconductor substrate. The term "located next" may be interpreted as formed in or on the same (a common) semiconductor photonic substrate 102.

The LIDAR system 200 includes a photonic integrated circuit (PIC) 100 and at least one LQHQ light source 400 integrated on or in the substrate 102 and coupled directly or indirectly (through a single-sideband (SSB) modulator 504 to impart an optical chirp and/or a semiconductor optical amplifier (SOA) to impart an optical gain) to the at least one light receiving input 104. The LQHQ light source 400 may be configured to emit a coherent electromagnetic radiation $\lambda_1, \lambda_2, \ldots, \lambda_M$, of one or more wavelength. Through this specification any kind of usable of "electromagnetic radiation" is denoted as "light" for illustration purpose only and even though the electromagnetic radiation may not be in the frequency range of visible light, infrared light/radiation or ultraviolet light/radiation. The LQHQ light source 400 may include a coherent electromagnetic radiation source 202 that may also be denoted as coherent light source 202 or light source 202.

The at least one LQHQ light source 400 may be configured to provide coherent electromagnetic radiation (also denoted as coherent light) to a plurality of optical channels 140-i, e.g. laser radiation in a visible light spectrum, an infrared spectrum, a terahertz spectrum and/or a microwave spectrum. As an example "light" may be visible light, infrared radiation, terahertz radiation or microwave radiation, and the optical components of the LIDAR system 200 may be configured accordingly. The light source 202 may be configured to be operated as a continuous wave laser and/or a pulsed laser. The light source 202 may be configured to be operated as a continuous wave (CW) laser, e.g. for frequency modulated continuous wave (FMCW) LIDAR in which the frequency of the light input to the input 104 is swept or chirped, and/or a pulsed laser, e.g. for TOF LIDAR. However, the light source 202 may also be a CW laser, e.g. a CW laser diode, operated in a pulsed mode, e.g. quasi CW (QCW) laser.

The PIC 100 further includes a plurality of optical channels 140-i each having and input port configured to receive back reflected light 122 from the target 210 and an output port configured to emit light 114 towards the target 210 (in the following also denoted as I/O ports). The I/O ports may be configured according to the PIC and LIDAR layout and design, e.g. according to a monostatic LIDAR having shared I/O ports per light path or a bistatic LIDAR having separated input and output ports per light path.

The one or more outputs I/O of the I/O structure 300 (also denoted as optical system 300) may be configured to emit electromagnetic radiation of the light source 202 to different parts of a target 210, e.g. at the same time or subsequently, e.g. along one or more optical channels 140-i, as illustrated in FIG. 2. This way, light emitted by the output I/O of the PIC 100 samples different portions of the target (not the same pixel) 210 and/or different targets 210 at the same time and allows to adjust the vertical resolution. Thus, light reflected 122 from the target 210 and detected by a photo detector of different light paths contains information correlated to different portions of a target (not the same pixel) and/or different targets at the same time. In other words, a plurality of optical channels 140-N emit light into different directions in space.

Figure 3A:
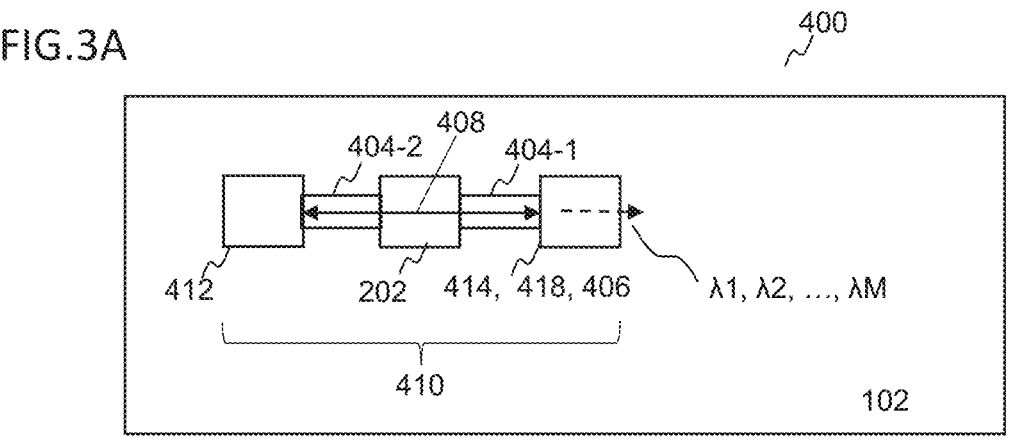
FIG. 3A and FIG. 3B illustrate schematic diagram of a LQHQ light source.
Figure 3B:
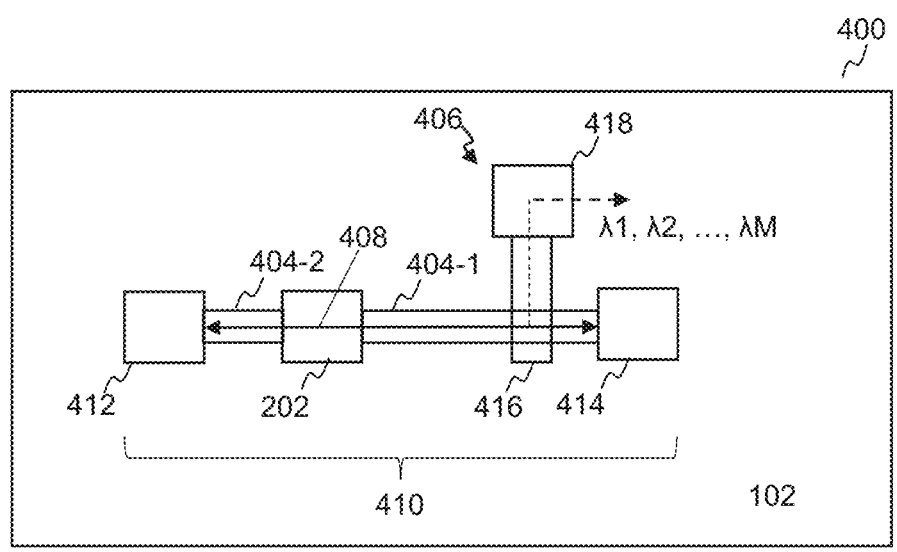

FIG. 3A and FIG. 3B illustrate schematic diagrams of LQHQ light sources 400. The LQHQ light source 400 includes a light source 202 coupled through a waveguide structure 404 (see FIG. 2), 404-1, 404-2 to an output structure 406 having one or more optically isolated outputs 418, 418-1, 418-2 (e.g. see FIG. 7) that are optically coupled to the plurality of optical channels 140-N (see FIG. 2). The waveguide structure 404, 404-1, 404-2 may be part of an optical cavity 410. The optical output structure 406 may be part of the optical cavity 410 (see FIG. 3A) or may be optically tapped through an optical tap 416 from the optical cavity 410.

Figure 4:
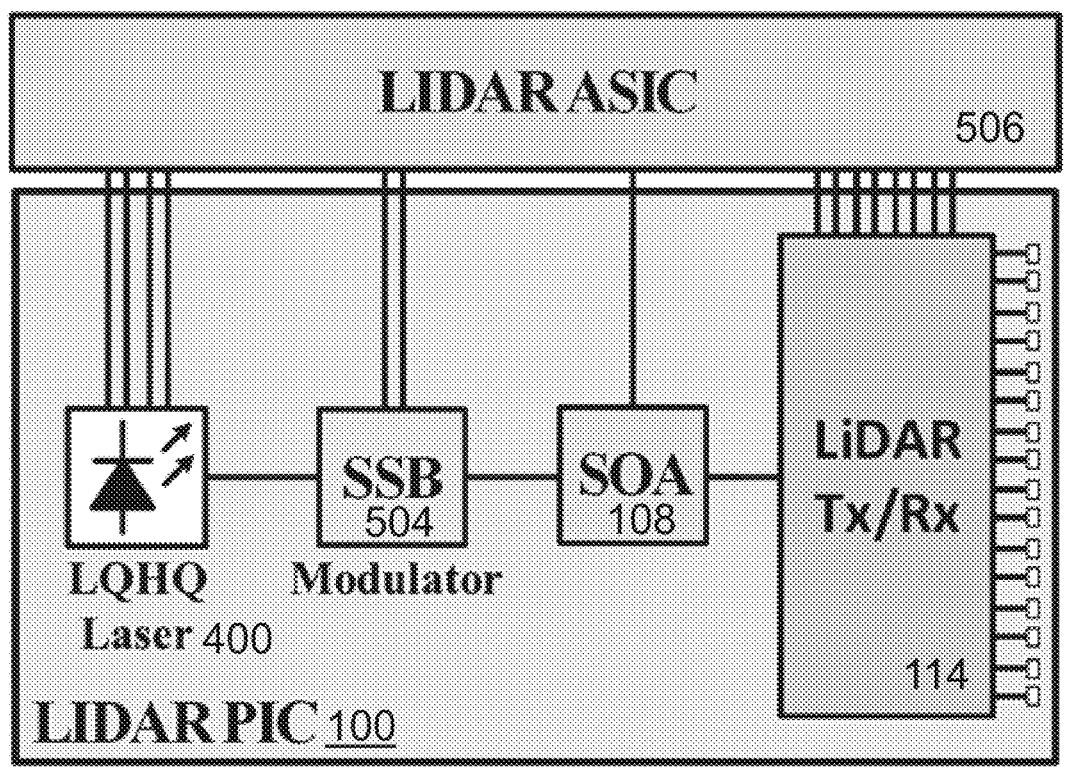
FIG. 4 illustrates a schematic diagram of a photonic integrated circuit.

FIG. 4 shows a coherent LIDAR PIC 100 and ASIC 506 including an LQHQ laser 400, an SSB-modulator 504, an SOA 108 and a multichannel LIDAR Transmitter/Receiver array 114. Here, the single-sideband (SSB) modulator 504 may be used to impart a frequency chirp on the continuous-wave (CW) output of the LQHQ light source 400 per coherent LIDAR system requirements. The SOA 108 may also be included to increase the output power level as required by coherent LIDAR system.

Figure 5:
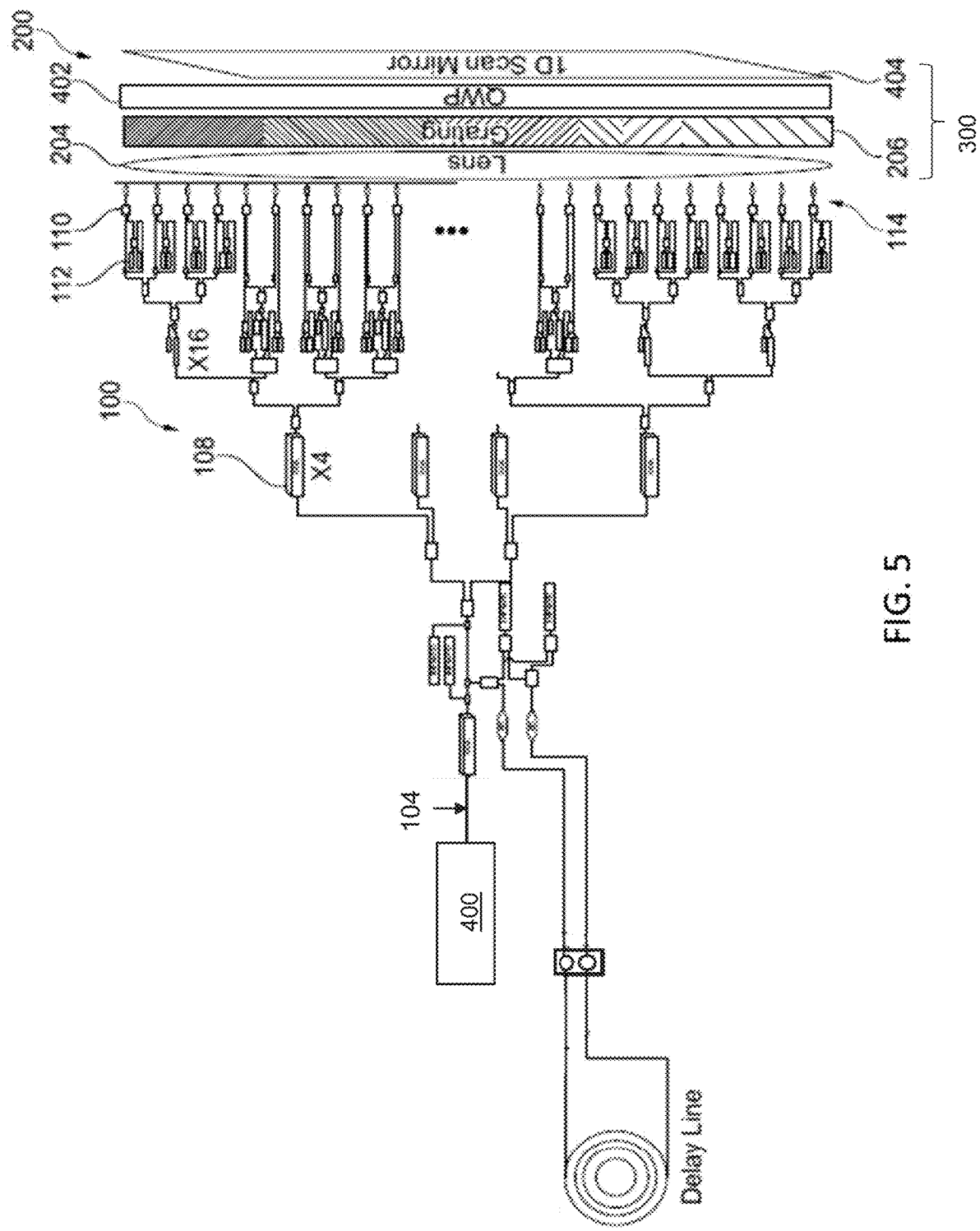
FIG. 5 illustrates a schematic diagram of a LIDAR system.

FIG. 5 illustrates a diagram of a LIDAR system 200, e.g. a monostatic LIDAR system 200. As an example, the optical system 300 may include a lens 204, a grating 206, a quarter wave plate 402, and a scanning mirror 404.

The lens 204 and the grating 206 may be optically arranged to guide light 114 from the output of the PIC 100 to the outside of the LIDAR system 200. The grating structure 206 may be optically arranged to guide light from lens 204 to the outside of the LIDAR system 200.

The grating structure 206 may be a transmission grating, a reflective grating, or a grism.

The lens 204 may be any one of a converging lens 204, a collimating lens 204 or a diverging lens.

As an example, the lens 204 may be configured and/or may be provided such that light from the outputs I/O of the optical channels 140-$i$ of the plurality of optical channels 140-N have different angles of inclination on a (planar) grating structure 206. However, the function of the lens 204 and of the grating structure 206 may also be integrated in a single optical element, e.g. a lens-shaped grating. The purpose of the lens 204 and the grating 206 may be to emit parallel light 114 from the outputs I/O of the optical channels 140-$i$ into different directions in space at the same time and receive and detect the light 122 back reflected from a target 210 in the photo detector.

A scan mirror 404 may be arranged in the optical channel 140-$i$ between the grating structure 206 and the outside of the LIDAR system 200. The scan mirror 404 may be configured to be movable, e.g. rotatable, to scan the environment of the LIDAR system 200. Alternatively, or in addition, the grating structure 206 may be configured to be movable, e.g. a movable reflection grating.

Further, a quarter wave plate (QWP) 402 or half wave plate (HWP) may be arranged in the light path between the grating structure 206 and the scan mirror 404.

The LIDAR system 200 may further include a controller 208. The controller 208 may be configured to control various electronic components, e.g. the light source, optical amplifiers, or other controllable optical components, e.g. a shutter. The controller 208 may be an application specific integrated circuit (ASIC), as an example. The controller 208 may be formed from, integrated in or mounted to the semiconductor photonic substrate 102. However, the controller 208 may also be located outside of the PIC 100.

Using a multiple (M) wavelength LQHQ light source 400 (in FIG. 5 M may be equal to 6, and thus there may be $\lambda 1, \lambda 2, \lambda 3, \lambda 4, \lambda 5, \lambda 6$) and the grating structure 206, the number of LIDAR channels may be increased by a factor of M for a given PIC 100 to achieve a desired high number (for example more than 16, e.g. more than 32) of vertical resolution elements or pixels. Hence, a high-performance coherent LIDAR system 200 is achieved. In general, using N parallel optical channels 140-N and M wavelengths in a wavelength-multiplexed LIDAR system 200 results in a total of M*N angular outputs. Hence, the LIDAR system 200 may have a high (>1M pixels/s) overall or effective data rate. The number of PIC channels N to increase the number of vertical resolution elements (or reduce the cost by using fewer or smaller PICs) is readily scalable. The coherent LIDAR with the LQHQ light source 400 implemented on a silicon PIC will (uniquely) enable the high performance and pricing required by customers for autonomous vehicle applications.

The wavelength $\lambda 1, \lambda 2, \lambda 3, \lambda 4, \lambda 5, \lambda 6$ may differ by a few Å to a few nm from each other, as an example. The LIDAR system 200 may include one or more LQHQ light source(s) 400 configured to emit electromagnetic radiation of different/multiple wavelengths/frequencies. The LQHQ light source 400 may be tunable via a controller to emit light of different predetermined wavelengths $\lambda 1, \lambda 2, \lambda 3, \lambda 4, \lambda 5, \lambda 6$. Alternatively, or in addition, an optical filter, e.g. a low pass, high pass, band pass or notch filter may select a wavelength/frequency of a plurality of wavelengths of a single LQHQ light source 400. This way, by using wavelength multiplexing of spatially parallel optical channels in the PIC 100, the detrimental effects due to fluctuating targets and TOF limitations are mitigated, thus enabling a coherent LIDAR with high optical resolution, high data rate, and long-range detection to be achieved.

Further illustrated in FIG. 5 is the branching of light paths from the at least one input 104 to the plurality of outputs I/O. The branching of light 116 from the LQHQ light source (see also FIG. 2) may be realized by a plurality of optical amplifiers 108, e.g. SOA 108, a plurality of optical splitters 110 and a plurality of waveguide structures (e.g. solid lines in FIG. 5).

The at least one optical splitter 110 may be configured to branch light received at the at least one light receiving input 104 to a plurality of optical channels 140-N. In each optical channel 140-$i$ of the plurality of optical channels 140-N, the photonic integrated circuit 100 may include at least one amplifier structure 108 to amplify the light in the light path to provide an amplified light. Each light path of the plurality of light paths may include at least one light output I/O configured to output the amplified light from the photonic integrated circuit 100 towards the lens 204. Each optical channel 140-$i$ of the plurality of optical channels 140-N may include at least one photo detector 112 configured to receive light 122 from the outside of the photonic integrated circuit 100. The at least one photo detector 112 may be located next to the at least one light output I/O, e.g. integrated in the common semiconductor photonic substrate 102.

A waveguide structure may be in the form of a strip line or micro strip line. However, a waveguide structure may also be configured as a planar waveguide. The waveguide structure may be configured to guide an electromagnetic radiation emitted from a light source 202 coupled to the input 104 to the output of the optical channels 140-$i$. The waveguide structure may be formed from the material of the semiconductor photonic substrate 102. Waveguide structures may be optically isolated from each other. As an example, at least one waveguide structure may be formed from semiconductor photonic substrate 102.

Further illustrated in FIG. 5 is a use of balanced photo detector pairs as photo detectors 112 in the optical channels 140-$i$ respectively. A photo detector pair 112 may reduce an impact of electronic noise on the detected signal. Further illustrated in FIG. 5 is a use of a part of the light from the optical splitter 110 as input signal for a photo detector 112 in the light paths respectively. Here, the input signal may be used as local oscillator (LO) for determining a difference between the light 114 emitted from the output I/O of the PIC 100 and light 122 received from the input I/O from the outside of the PIC 100 at the photo detector 122, e.g. in monostatic or bistatic LIDAR systems. This way, temporal fluctuations of the emitted light 114 may be considered in the received light 122 for each optical channel 140-$i$ individually.

The photo detector 112 of different light paths 140-$i$ may be optically isolated from each other and/or may be addressable independently from each other. In other words, the photo detectors 112 of different optical channels 140-$i$ may be configured to detect light from the outside of the PIC 100 independently from each other.

Figure 19:
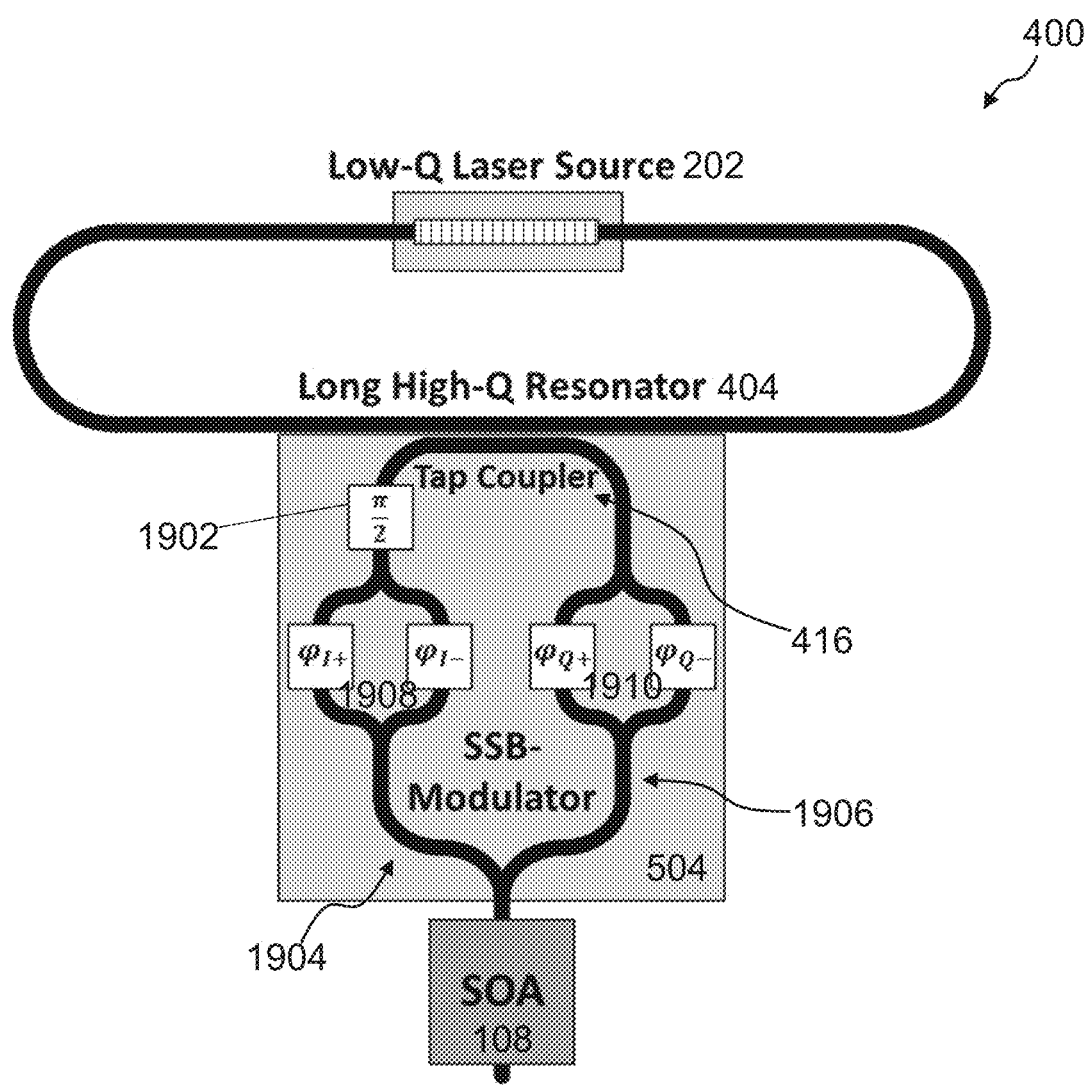

Alternatively to the delay line illustrated in FIG. 5, a SSB 504 to impart an optical chirp and/or a SOA 108 to impart an optical gain may be arranged following the LQHQ light source 400, e.g. between the output of the LQHQ light source 400 and the input/waveguide 104, as illustrated in FIG. 2, 4 or 19. This way, a delay line may be optional, e.g. may not be needed.

Figure 6:
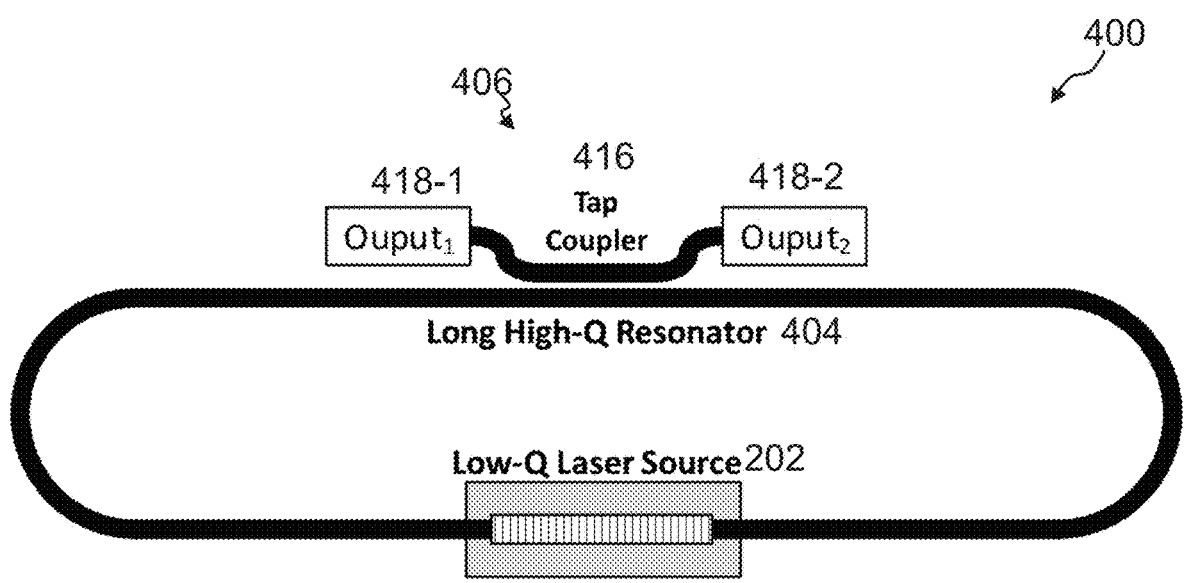
FIG. 6 illustrates a schematic diagram of a LQHQ light source.
Figure 7:
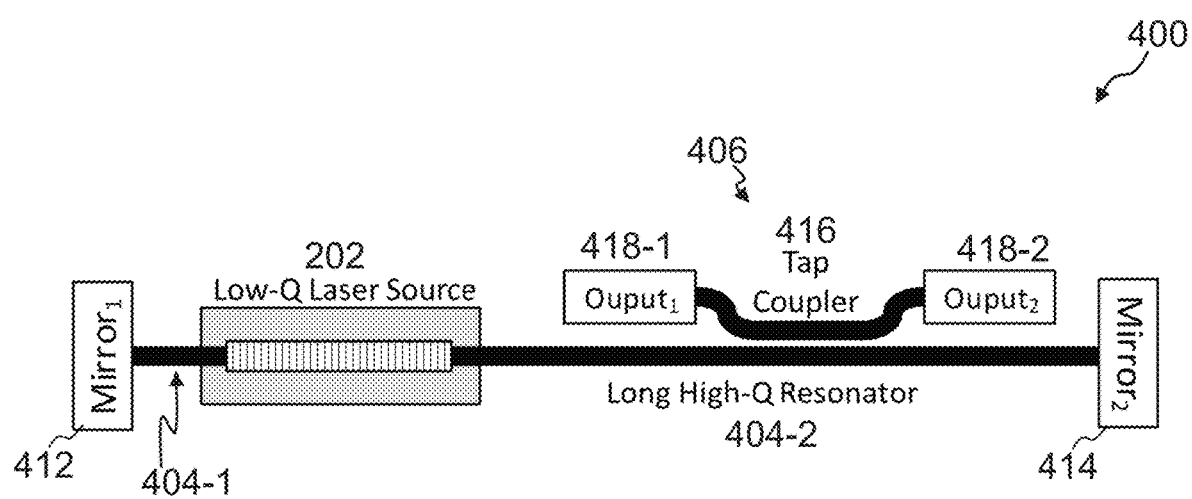
FIG. 7 illustrates a schematic diagram of a LQHQ light source.

An example of a ring configuration of a LQHQ light source 400 may be shown in FIG. 6 and an example of a linear configuration of a LQHQ light source 400 may be shown in FIG. 7.

The tap coupler 416 may be configured to provide the optical outputs 418-1, 418-2 for the LQHQ light source 400, while retaining the high-Q of the waveguide structure 400 acting as long resonator. At least one partially reflecting mirror may be used for the first mirror 412 or the second mirror 414 (see FIG. 3A) instead of the tap coupler 416. This way, the optical output 418 may be provided without additional optical tap 416. Alternatively, the first mirror 412 may be part of the tunable low-Q laser source 202. As an example, the laser source 202 may include a high reflective (HR) coating on a facet of the multi-wavelength or tunable laser source 202, and the HR coating may act as the first mirror 412 (see FIG. 2).

The multi-wavelength or tunable low-Q laser source 202 may be configured in accordance with the wavelength plan of the coherent LIDAR system 200.

The tunable low-Q laser source 202 may be dynamically set to a desired wavelength per control, e.g. a controller (not illustrated) of the coherent LIDAR system 200.

Examples of a low-Q laser source 202 may be a tunable distributed feedback (DFB) laser or a distributed Bragg reflector (DBR) laser, a tunable sampled grating (SG) DFB laser or a SG-DBR laser, a tunable ring laser, a tunable microring laser, a multi-wavelength Fabry-Perot (FP) laser in combination with a tunable filter, a multi-wavelength DFB laser or a multi-wavelength DBR laser in combination with a tunable filter combination respectively, a multi-wavelength SG-DFB laser or a multi-wavelength SG-DBR laser in combination with a tunable filter respectively. The SG may include a phase defect such as a quarter-wave shift (QWS). The SG may be apodized or tapered with a function, e.g. a sinc-function, to improve the optical performance and stability of the LQHQ light source 400.

In the combination examples, the optical spectrum of the multi-wavelength FP, DFB, DBR, SG-DFB, or SG-DFB laser may be configured in accordance with the wavelength plan of the coherent LIDAR system, as described above. The tunable filter may be configured to sufficiently attenuate the unwanted wavelengths of the multi-wavelength FP, DFB, DBR, SG-DFB, or SG-DFB laser, except for the desired wavelength, which may change with time, per control of the coherent LIDAR system 200.

Examples of a tunable filter may be a tunable or switchable Mach-Zehnder interferometer or Michelson interferometer, a tunable bandpass filter, and a tunable or switchable ring filter. A typical sufficient attenuation value may be $\geq$~0.5 dB.

As an example, the tunable filter may be configured such that the optical bandwidth of the tunable filter is greater than the mode spacing of the LQHQ light source 400 and the waveguide structure 404 acting as the long high-Q resonator. Thus, longitudinal mode selection for single-mode operation of the LQHQ light source 400 may be accomplished by the tunable low-Q laser source 202.

The waveguide structure 404 acting as long high-Q resonator may enable a narrow linewidth and an optical feedback tolerance of the LQHQ light source 400.

For example, the waveguide structure 404 acting as the long high-Q resonator may be formed in a ring configuration or a linear configuration, as illustrated in FIG. 6 and FIG. 7.

Figure 8:
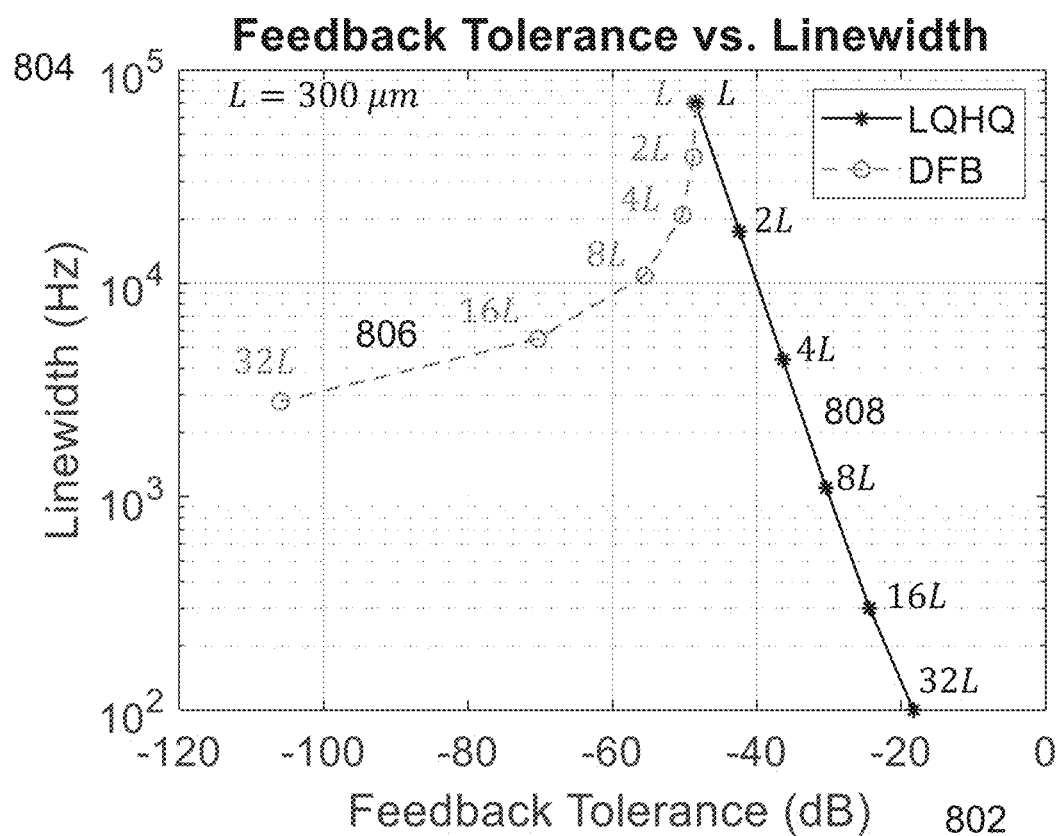
FIG. 8 illustrates a diagram of characteristics of a LQHQ light source and a comparative example.
Figure 9A:
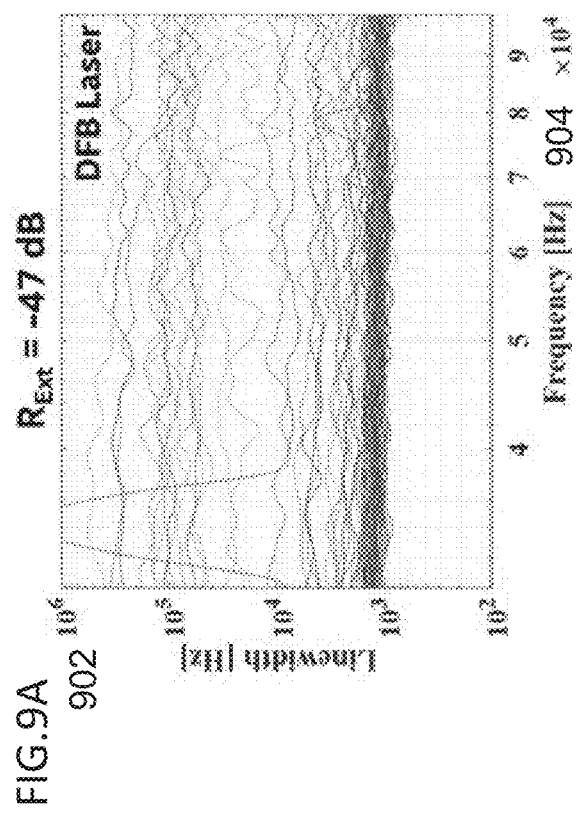
FIG. 9A to FIG. 9D illustrate diagrams of characteristics of a LQHQ light source and a comparative example.
Figure 9D:
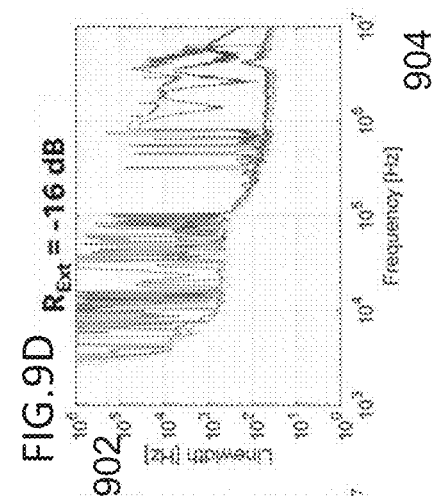
Figure 9C:
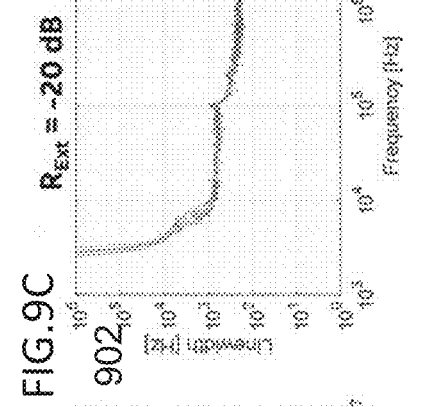
Figure 9B:
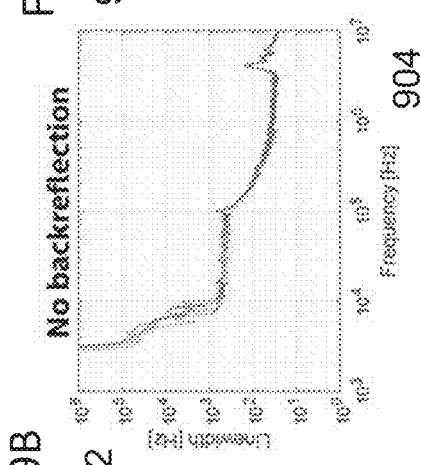

The length of the waveguide structure 404 acting as high-Q resonator may be configured to achieve the requisite narrow linewidth and the optical feedback tolerance for the LQHQ light source 400 by using the data in FIG. 8, for example.

FIG. 8 illustrates a diagram of the linewidth 804 as a function of the feedback tolerance 802 as a function of laser length (L, 2L, . . . , 32L) of a LQHQ light source 808 and a conventional DFB light source 806. It can be seen, that although the linewidth of a conventional DFB laser may improve with device length, its tolerance to optical feedback decreases with increasing length. Thus, it can be seen that the LQHQ light source 808 shows a better feedback tolerance and linewidth than a conventional DFB light source 806.

As an example, the LQHQ light source 400 may be configured to have an effective linewidth of <10 kHz (at frequencies >$10^4$ Hz) and an optical feedback tolerance of >−30 dB to achieve predefined LIDAR performance goals and to enable an integration of the light source in the PIC without discrete optical isolators. This may correspond to a long waveguide structure 404 acting as high-Q resonator having a length of equal or more than ~1 cm and a (second) Q factor of ~$10^5$.

FIG. 9A to FIG. 9D shows experimental data showing the linewidth 902 as a function of an effective linewidth 904 for a conventional DFB laser (FIG. 9A) and an exemplary LQHQ laser source (FIG. 9B to FIG. 9D) for different optical feedbacks. The experimental data demonstrate a ~30 dB optical feedback tolerance improvement for an LQHQ light source 400 over a DFB laser (without optical isolators), while maintaining an effective optical linewidth of <10 kHz (at frequencies >$10^4$ Hz).

Figure 10A:
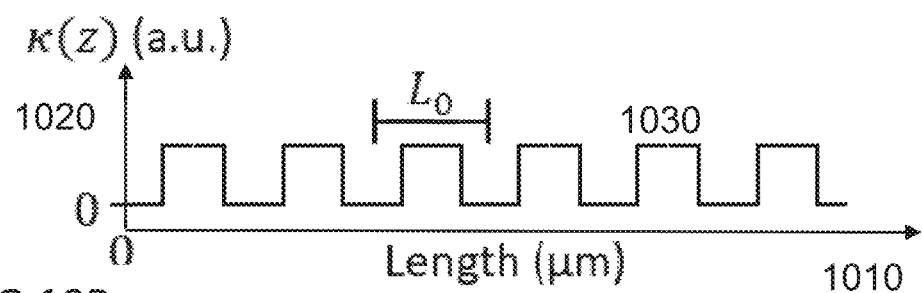
Figure 10B:
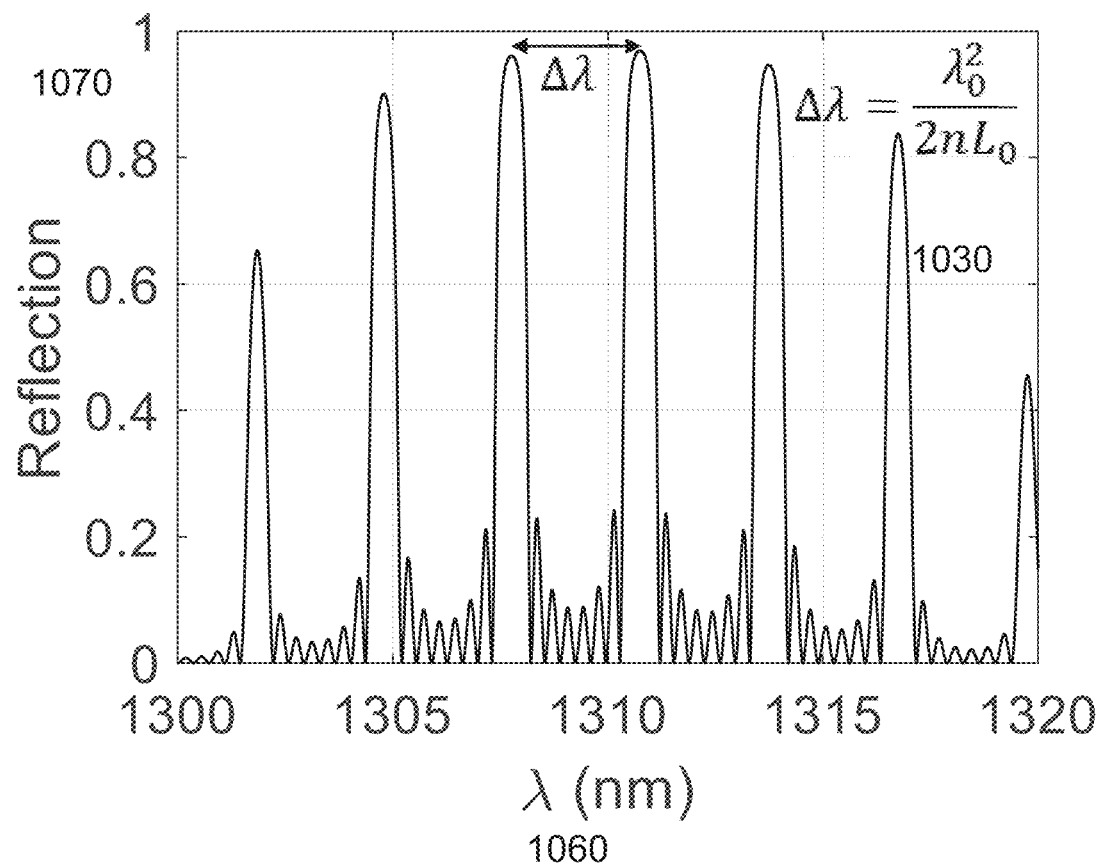

FIG. 10A shows an example of a sampled grating with a periodicity of $L_0$ 1030 (coupling coefficient K 1020 as a function of length 1010 in μm) and FIG. 10B shows the adjacent wavelength spacing of the sampled grating is $\Delta\lambda =$ $$\frac{\lambda_0^2}{2nL_0}$$

(reflection coefficient 1070 of the grating as a function of wavelength 1060).

Exemplary, the wavelength control of a LQHQ light source 400 may be achieved through selection of an SG-DFB or SG-DBR laser grating with a burst periodicity $L_0$, which may yield an adjacent wavelength spacing of $$\Delta\lambda = \frac{\lambda_0^2}{2nL_0},$$

Here, $\lambda_0$ may be the free-space wavelength and n the refractive index.

A flat reflection spectrum may be desirable and can be achieved by utilizing a sinc apodization of the form $$\text{sinc}\left(\frac{a}{L_0}\left(Z - \frac{L_0}{2}\right)\right) = \frac{\sin\left(\pi \frac{\alpha}{L_0}\left(z - \frac{L_0}{2}\right)\right)}{\pi \frac{\alpha}{L_0}\left(z - \frac{L_0}{2}\right)}$$

that may be truncated at z=0 and z=$L_0$. This may result in a reflection spectrum bandwidth of $$\Delta\lambda_{FWHM} \approx a\frac{\lambda_b^2}{2nL_0} \approx a\Delta\lambda,$$

where $\lambda_b$ is the Bragg wavelength of the grating.

A sampling period of the sinc apodization may be chosen so that $L_0$ corresponds to the desired adjacent wavelength or channel spacing, $\Delta\lambda$, of the M discrete wavelengths according to the equation $$L_0 = \frac{\lambda_0^2}{2n\Delta\lambda}.$$

The free parameter, α, may determine the overall bandwidth of the reflection spectrum and its value may be given by the number of wavelengths M specified by the coherent LIDAR system.

Figure 11A:
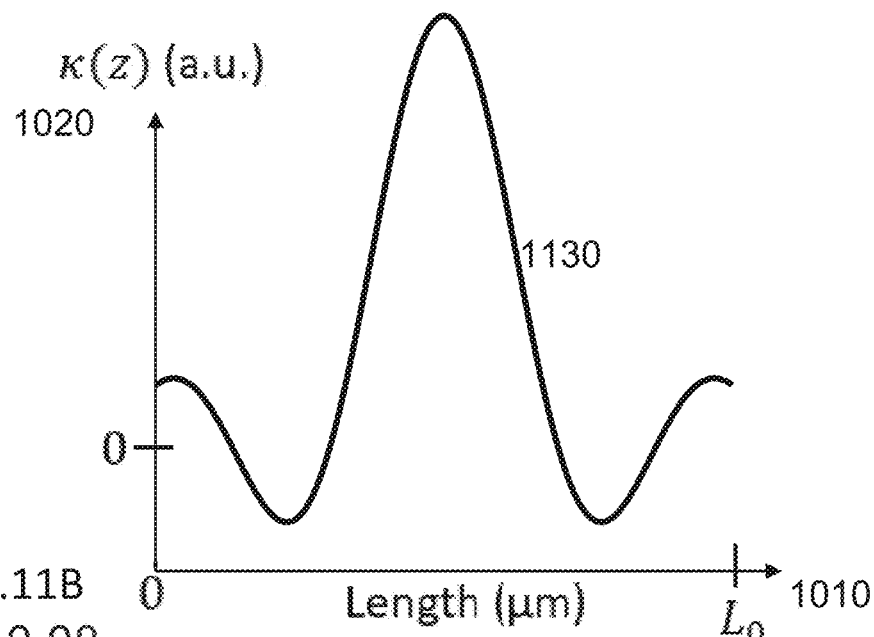
Figure 11B:
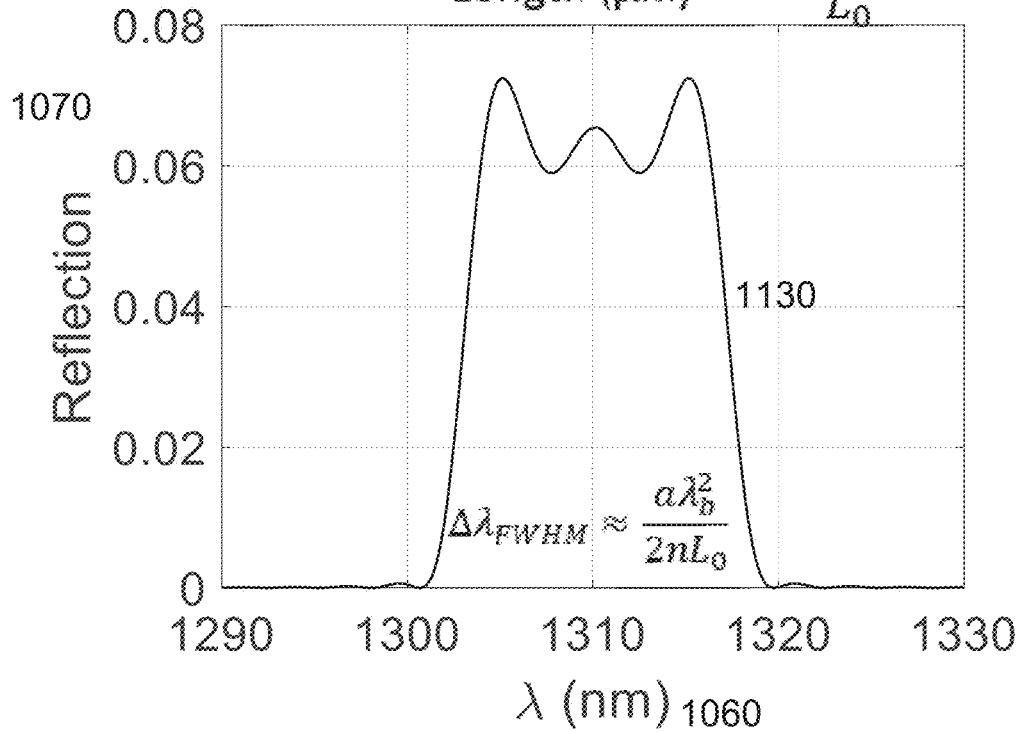

An example of the apodization and reflection spectrum of such a grating 1130 may be shown in FIG. 11A and FIG. 11B, where a=5.25 and $L_0$=90 μm. Here, FIG. 11A shows an embodiment of a sinc apodized grating of length $L_0$ and FIG. 11B shows the corresponding reflection spectrum of the grating shown in FIG. 11A. The full width half-max of the reflection is $$\Delta\lambda_{FWHM} \approx \frac{a\lambda_b^2}{2nL_0}.$$

Figure 12A:
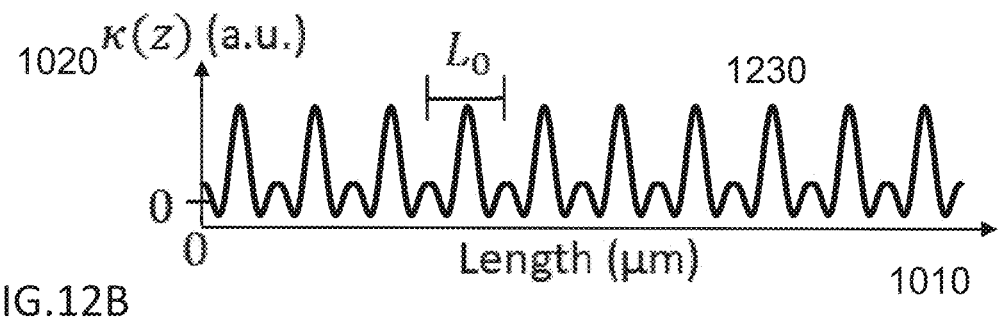
Figure 12B:
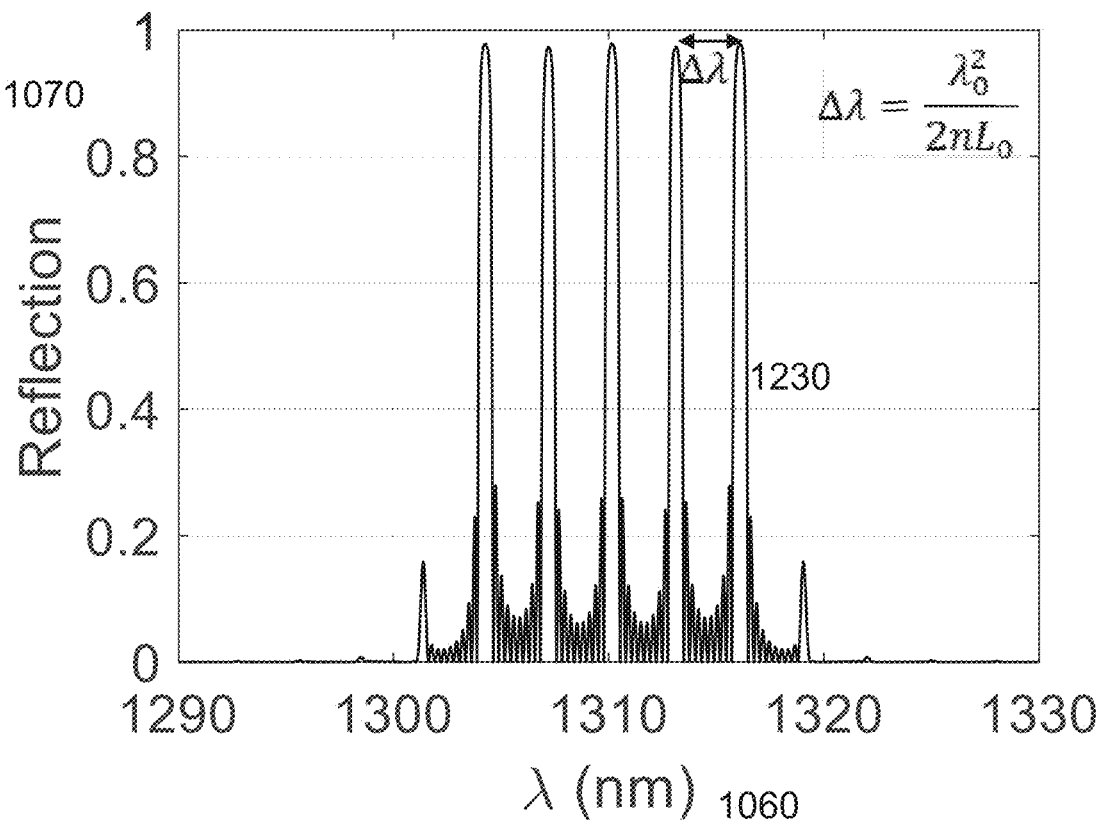

FIG. 12A shows an example of a sinc-sampled grating apodization for an odd number of wavelengths, where N=10 samples, α=5.25, and the periodicity $L_0$=90 μm. FIG. 12B shows the corresponding reflection spectrum of the grating 1230 shown in FIG. 12A. The wavelength spacing may be given by the sampling periodicity according to $$\Delta\lambda = \frac{\lambda_0^2}{2nL_0}.$$

Figure 13A:
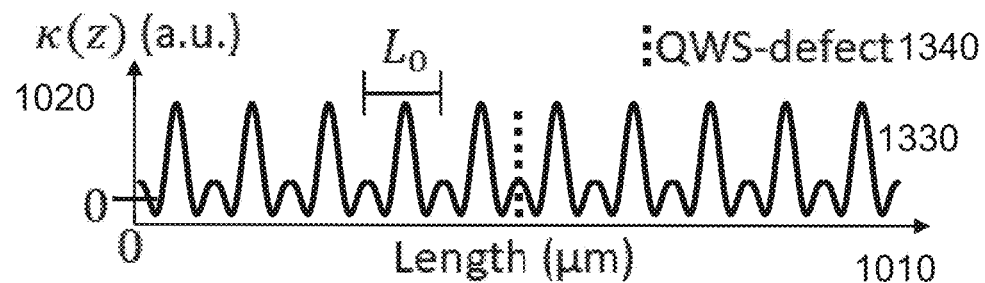
Figure 13B:
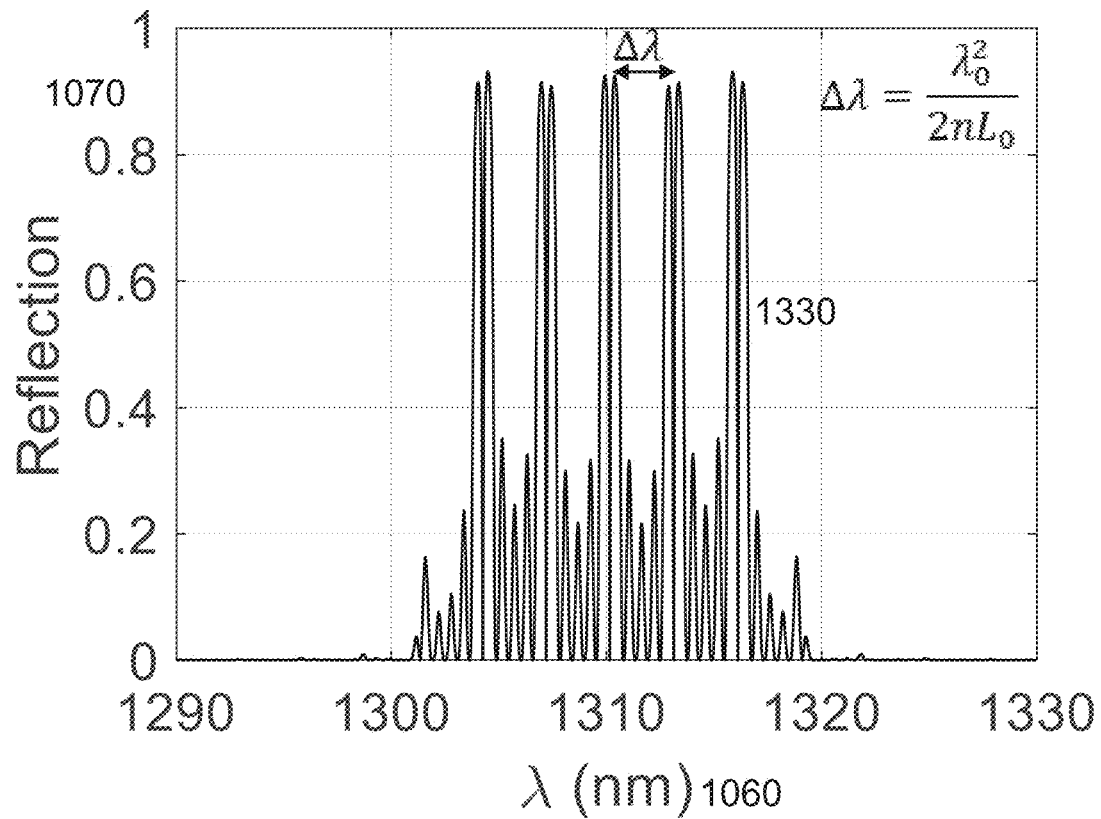

FIG. 13A shows an example of a sinc-sampled QWS-defect grating apodization for an odd number of wavelengths, where 2N=10 samples, a=5.25, and the periodicity $L_0$=90 μm. After N=5 samples a QWS-defect is incorporated into the grating, followed by another N=5 samples. FIG. 13B shows the corresponding reflection spectrum of the grating shown in FIG. 13A. The wavelength spacing is given by the sampling periodicity according to $$\Delta\lambda = \frac{\lambda_0^2}{2nL_0}.$$

Thus, a phase defect in the sampled grating may be used. In such a case, 2N (N=1, 2, 3 . . . ) grating periods may be required for symmetry purposes. N sinc apodized gratings periods may be cascaded, followed by a quarter-wave shift defect after the Nth period, and another N sinc apodized grating periods.

Additionally, in the SG-DFB case due to the low effective coupling (K) of the sinc apodization, the photonic mode may be preferentially spread out longitudinally throughout the grating. This way, the effects of spatial hole burning that typically plague standard QWS-defect DFB lasers may be reduced.

Figure 14A:
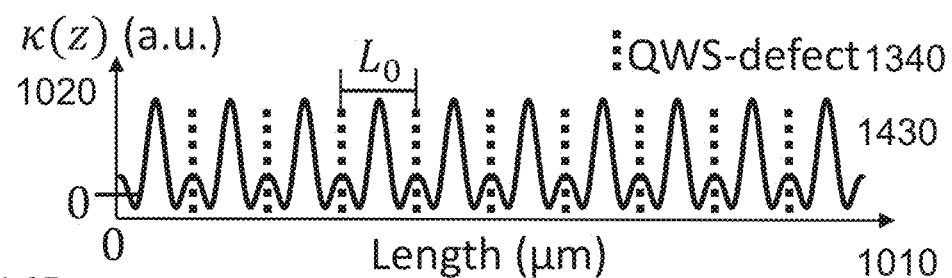
Figure 14B:
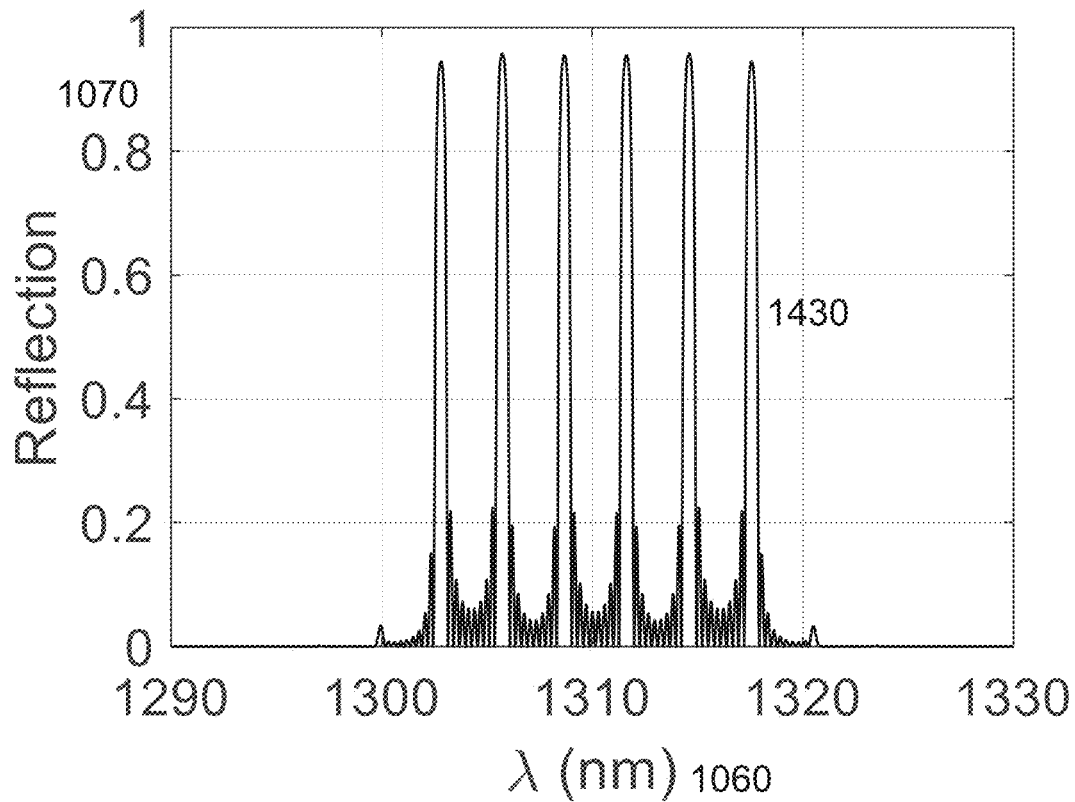

FIG. 14A shows a sinc-sampled grating apodization for an even number of wavelengths, where N=10 samples, α=6, and the periodicity $L_0$=90 μm. A QWS-defect 1340 is sandwiched between each grating sampling. FIG. 14B shows the corresponding reflection spectrum of the grating 1430 shown in FIG. 14A. The wavelength spacing may be given by the sampling periodicity according to $$\Delta\lambda = \frac{\lambda_0^2}{2nL_0}.$$

Thus, if an even number of wavelengths may be required by the LIDAR system 200, a slightly altered grating apodization may be used. In this case, an appropriate apodization choice may be N sinc apodized grating periods, where a QWS-defect may be sandwiched between each grating period. A grating defect may be preferred here as well. In this case, there may be 2N total sinc apodized grating periods with QWS-defects sandwiched between each period.

Figure 15A:
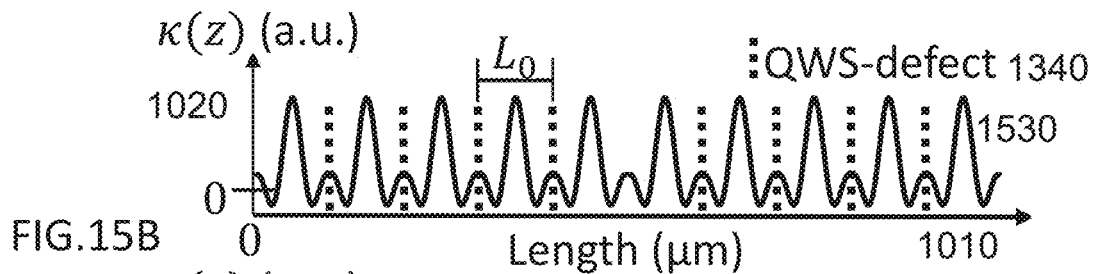
Figure 15B:
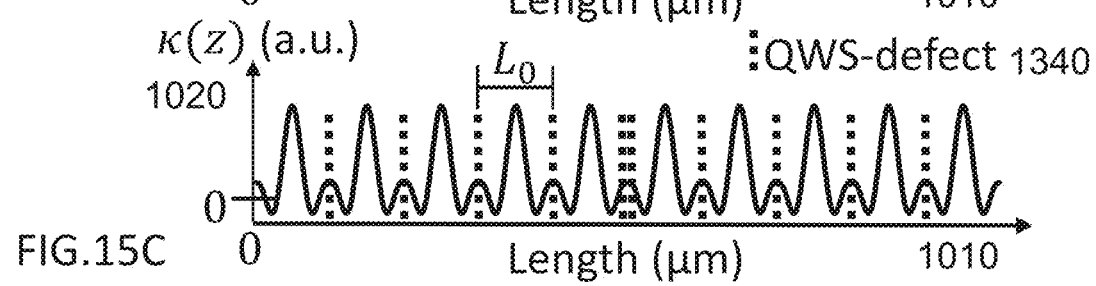
Figure 15C:
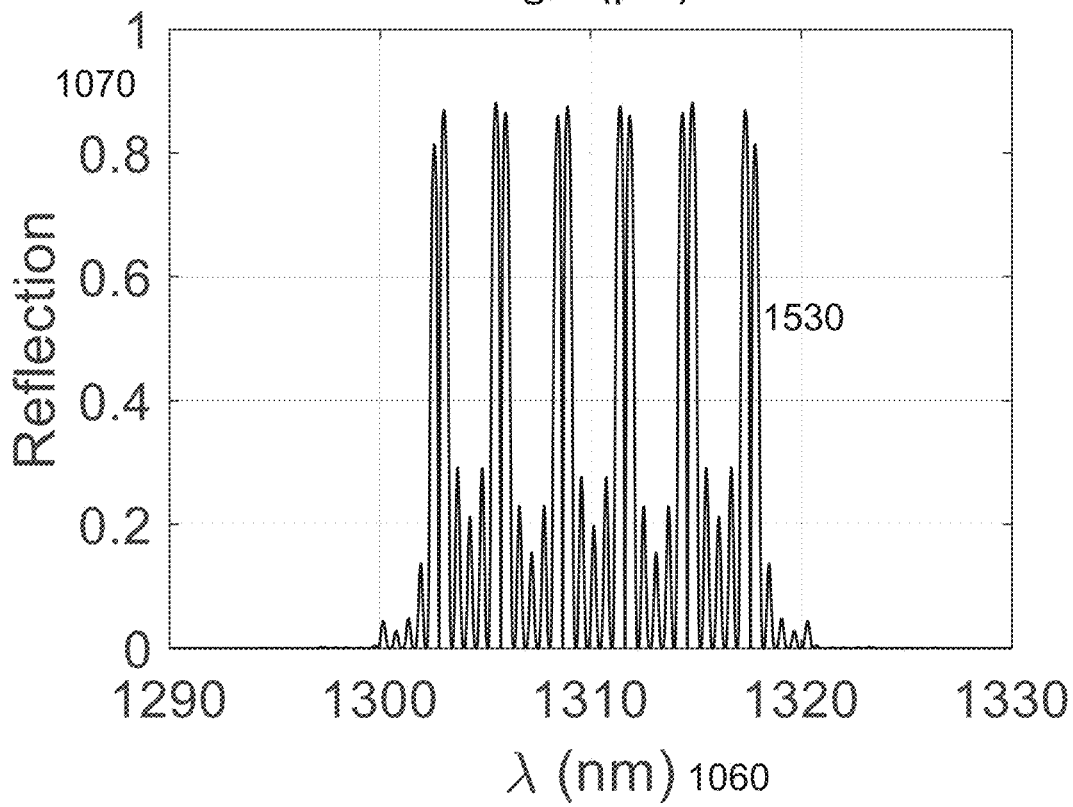

FIG. 15A and FIG. 15B show examples of a sinc-sampled QWS-defect grating apodization for an even number of wavelengths, where 2N=10 samples, α=6 and the periodicity $L_0$=90 μm. A QWS-defect 1340 is sandwiched between the first N=5 samples, followed by either no QWS-defect (FIG. 15A) or a half-wave shift defect (FIG. 15B), which is then followed by another N=5 samples with a QWS-defect sandwiched between each sampling. FIG. 15C shows the corresponding reflection spectrum of the grating 1530 shown in FIG. 15A. The wavelength spacing may be given by the sampling periodicity according to $$\Delta\lambda = \frac{\lambda_0^2}{2nL_0}.$$

Thus, to create a defect in the grating, after the Nth period, the QWS-defect 1340 may be removed, or alternatively another QWS-defect 1340 may be added.

An example of a low-Q laser source 202 is shown in FIG. 16A. In this example, the multi-wavelength laser structure 1600 may provide a wavelength grid with 3 nm spacing 1630, as shown in FIG. 16B (output 1622 of laser 1600 as a function of wavelength 1620 relative to a desired wavelength 1632 at 0), and a Mach-Zehnder Interferometer (MZI) 1602 with an optimum Free Spectral Range (FSR) of 1.8 nm attenuates unwanted wavelengths by >4 dB below the desired wavelength 1632, as shown in FIG. 16C c (output 1624 of LQ laser source 202 as a function of relative wavelength 1620). The attenuation function 1634 of MZI 1602 is illustrated as dashed line in FIG. 16C and the resulting output 1632 of LQ laser source 202 is illustrated as solid line in FIG. 16C. Thus, the MZI filter 1602 may be configured to sufficiently attenuate the undesired relative wavelengths (−6 nm, −3 nm, 3 nm, 6 nm) and select the relative wavelength at 0 nm The MZI filter 1602 may be implemented with a single-phase shifter 1604, also known as Single-Drive configuration, or in Dual-Drive (DD) configuration, wherein both arms have individual phase shifters 1604, 1606.

The DD configuration may enable push-pull operation, which allows tuning the filter by shifting its spectral response without necessarily affecting its phase response or insertion loss.

The DD configuration may allows to configure the overall phase delay of the MZI filter 1602, thus eliminating the need for a phase shifter outside of the MZI filter.

The DD configuration may effectively halves the maximum phase shift required in the phase shifters, which typically results in an overall lower insertion loss and power consumption.

FIG. 17A shows an example of a Low-Q laser source 202 implemented with a ring filter 1704 configured to sufficiently attenuate undesired relative wavelengths (−6 nm, −3 nm, 3 nm, 6 nm) and select the relative wavelength at 0 nm (FIG. 17B and FIG. 17C). The ring filter 1704 may include a phase shifter 1702. The attenuation function 1734 of the ring filter 1704 is illustrated as dashed line in FIG. 17C and the resulting output 1732 of LQ laser source 202 is illustrated as solid line in FIG. 17C. Thus, in this example, the multi-wavelength laser 1600 provides a wavelength grid 1730 with 3 nm spacing (FIG. 17B), and the ring filter 1704 with an optimum FSR of 1.1 nm attenuates unwanted wavelengths by >7.5 dB below the desired wavelength (FIG. 17C).

FIG. 18A shows an example of a ring configuration of the LQHQ light source 400. In this example, the multi-wavelength laser source may be implemented as a sinc-sampled Quarter Wave Shifted (QWS) Distributed Feedback Laser (DFB) 1800 that provides a wavelength grid 1830 with 3 nm spacing (FIG. 18B), and the desired wavelength 1832, 1834 may be selected by a DD-MZI filter with an FSR of 1.8 nm (FIG. 18C). Additionally, this configuration may include a monitor photodiode (MPD) 1802 in the second output of the MZI filter 1602, which may be used as a feedback source for the wavelength tuning algorithm and control of the low-Q laser source 202.

FIG. 19 shows an example of an LQHQ laser source 400 integrated with a single-sideband (SSB) modulator 504 and a semiconductor optical amplifier (SOA) 108. In this example, the configuration may take advantage of the two outputs 418-1, 418-2 of the tap coupler 416 (see also FIG. 6) by using them as inputs to the SSB-modulator 504. The SSB-modulator 504 may include a phase shifter 1902 in one arm coupled to one output of the tap coupler 416 and The SSB-modulator 504 may include an "I modulator" 1908 and a "Q modulator" 1910 as in a conventional SSB-modulator 504. The SSB-modulator 504 may eliminate the need for an input splitter and thus may reduce its insertion loss.

In other words, the PIC 100 may include a semiconductor substrate 102 having integrated a plurality of optical channels 140-i each configured to emit 114 coherent light of a first wavelength $\lambda_1$ and a second wavelength $\lambda_2$ to the outside and to receive 120 coherent light of the first wavelength $\lambda_1$ and the second wavelength $\lambda_2$ from the outside. Integrated in or on the substrate 102 may be understood as formed from (e.g. by a doping process) or deposited on (e.g. layer-by-layer) the substrate 102. The first wavelength and the second wavelength are part of a wavelength plan of the LIDAR system 200.

A Doppler shift caused by a moving target 210 is not considered in the received first wavelength $\lambda_1$ and second wavelength $\lambda_2$. In other words, the target 210 is considered as stationary in view of the velocity of the light emitted by the LQHQ light source 400. Thus, the first wavelength of the emitted light is about equal to the first wavelength of the received light, and the second wavelength of the emitted light is about equal to the second wavelength of the received light.

The semiconductor substrate 102 may further have integrated a semiconductor light source 202. The light source 202 may be configured to emit coherent light of at least the first wavelength $\lambda_1$ and the second wavelength $\lambda_2$. The semiconductor light source 202 may have a first Q factor. The Q factor describes the damping characteristics. The Q factor may be determined as the ratio of the initial energy stored to the energy lost in one radian of the cycle of oscillation. The Q factor may alternatively be determined as the ratio of a center frequency to its bandwidth when subject to an oscillating driving force. A higher) factor may indicate a lower rate of energy loss.

The semiconductor substrate 102 may further have integrated a waveguide structure 404 optically coupled to the semiconductor light source 202. The waveguide structure 404 may have a second Q factor that may be higher than the first Q factor. The waveguide structure 404 may be configured to form an optical cavity (also denoted as optical resonator) for at least the light of the first wavelength $\lambda_1$ and the second wavelength $\lambda_2$. In other words, light emitted from the light source 202 may be coupled into the waveguide structure 404. This way, the linewidth of the light of the first wavelength $\lambda_1$ and the second wavelength $\lambda_2$ that may be emitted from the LQHQ light source 400 may be lower than of the light source 202. As an example the first Q factor may be equal or less than about $5 \times 10^4$. The second Q factor may be equal or more than about $5 \times 10^4$.

As an example, the waveguide structure 404 may include a ring-shaped waveguide configured to guide light of the first wavelength and the second wavelength, e.g. see FIG. 18 and FIG. 19. As another example, the waveguide structure 404 may include a linear-shaped waveguide configured to guide light of the first wavelength and the second wavelength, as illustrated in FIG. 2, FIG. 3 and FIG. 17.

The semiconductor substrate 102 may further have integrated an optical output structure 406 configured to optically couple the waveguide structure 404 with the plurality of optical channels 140-i to transmit light of the first wavelength $\lambda_1$ and the second wavelength $\lambda_2$ from the waveguide structure 404 to the plurality of optical channels 140-i and further configured to keep the waveguide structure 404 substantially free from light from the optical channels. Here, substantially free may be understood that less than 2%, e.g. less than 1%, of the light emitted from LQHQ light source 400 into the plurality of optical channels 140-N is fed back into the LQHQ light source 400. In other words, the optical output structure 406 may be configured to optically isolate the LQHQ light source 400 from the plurality of optical channels 140-N. This way, the feedback tolerance of the LQHQ light source 400 may be higher than of the light source 202. The optical output structure 406 may be integrated on the substrate 102 and not a discrete component of the known art, e.g. a Faraday rotator. In other words, the LQHQ light source 400 may include a lower linewidth while having a higher feedback tolerance than a light source of the known art.

As an example, the optical output structure 406 may include a tap coupler 416 optically coupled to the waveguide structure 404 (see FIG. 36). The optical output structure 406 may be configured to include one or more outputs 418. The one or more outputs 418 may be optically coupled to the tap coupler 416.

As an example, the optical output structure 406 may include at least a first optical output 418-1 and a second optical output 418-2 optically isolated from each other. At least one of the first optical output 418-1 and the second optical output 418-2 may be optically coupled to the plurality of optical channels 140-N. At least one of the first optical output 418-1 and the second optical output 418-2 may be coupled to a controller configured to control the light source 202 to set the wavelength of the light emitted into the optical channels 140-N. As another example, the optical output structure 406 may include a waveguide structure 404 having a ring structure (see FIG. 17). As yet another example, the optical output structure 406 may include a partially reflecting (second) mirror 414 having a reflectivity for the first wavelength and the second wavelength that may be equal or less than 99% of the incoming light. This way, the mirror 414 may be an output of the LQHQ light source 400 (see FIG. 3A).

As illustrated in FIG. 3A and FIG. 3B, the waveguide structure 404 may include at least a (second) mirror 414 and the light source 202 may be optically coupled through a first waveguide 404-1 with each other to form the optical cavity. The waveguide structure 404 further may include a first mirror 412 optically coupled through a second waveguide 404-2 with the light source 202 to form the optical cavity. However, the light source 202 may include a high reflective coating on a facet to back reflect light received in the light source 202 from the waveguide structure 404, as illustrated in FIG. 2.

The light source 202 may be configured as a multi-wavelength laser, e.g. emit light of different wavelengths at the same time. Alternatively, or in addition, the light source 202 may be configured as a tunable laser, e.g. may selectively emit light of one or more wavelengths at a time. A controller may be configured to control the tunable laser to emit light of one of the at least first wavelength $\lambda_1$ and the second wavelength $\lambda_2$. As an example, the light source 202 may be one of the group of a tunable distributed feedback laser, a DBR laser, a tunable sampled grating-distributed feedback laser, a sampled grating-DBR laser, a tunable ring laser, a tunable microring laser, a multi-wavelength FP laser in combination with a tunable optical filter, a multi-wavelength distributed feedback laser in combination with a tunable optical filter, DBR laser in combination with a tunable optical filter, and a multi-wavelength sampled grating-distributed feedback laser in combination with a tunable optical filter or a sampled grating-DBR laser in combination with a tunable optical filter. The light source 202 may include a tunable optical filter configured to select one of the first wavelength and second wavelength. As an example, the tunable laser may include a tunable filter may include at least one of a tunable Mach-Zehnder interferometer or Michelson interferometer, a switchable Mach-Zehnder interferometer or Michelson interferometer, a tunable bandpass filter, a tunable ring filter or a switchable ring filter, e.g. see FIG. 16 and FIG. 18. The tunable optical filter may be configured to attenuate light of at least one wavelength of the light source 202 by an attenuation value of equal or more than about 0.5 dB (as described in more detail below). As an example, the tunable filter may be configured to have an optical bandwidth greater than a mode spacing of the light source 202 and/or waveguide structure 404. As an example, the light source 202 may be a sampled grating laser and may include a phase shifting component. As an example, the light source 202 may be a sampled grating laser that may be apodized or tapered with a sinc-function. As an example, the light source 202 may be configured for longitudinal mode selection for single-mode operation.

An optical length of the waveguide structure 404 may be selected to achieve a predefined linewidth and/or a predefined optical feedback tolerance. As an example, the waveguide structure 404 may include an optical length of equal or more than about 1 cm and a second Q factor of about $10^5$. As an example, the waveguide structure 404 may include a Mach-Zehnder Interferometer, wherein the Mach-Zehnder Interferometer may be configured in a Single-Drive configuration that may include a single phase shifter. Alternatively, the waveguide structure 404 may include a Mach-Zehnder Interferometer, wherein the Mach-Zehnder Interferometer may be configured in a Dual-Drive configuration that may include at least a first light path having a first phase shifter and a first output, and a second light path having a second phase shifter and a second output.

The light transmitted into the plurality of optical channels 140-$i$ through the optical output structure 406 may be a continuous wave and wherein the plurality of optical channels 140-$i$ may include at least one optical chirp structure, e.g. an SSB modulator 204, configured to chirp the light such that the light emitted to the outside may include a frequency chirp.

EXAMPLES

The examples set forth herein are illustrative and not exhaustive.

Example 1 is a photonic integrated circuit may include a semiconductor substrate having integrated: a plurality of optical channels each configured to emit coherent light of a first wavelength and a second wavelength to the outside and to receive coherent light of the first wavelength and the second wavelength from the outside; a semiconductor light source configured to emit coherent light of at least the first wavelength and the second wavelength, the semiconductor light source having a first Q factor, a waveguide structure optically coupled to the semiconductor light source, the waveguide structure having a second Q factor that is higher than the first Q factor, the waveguide structure configured to form an optical cavity for at least the light of the first wavelength and the second wavelength; an optical output structure configured to optically couple the waveguide structure with the plurality of optical channels to transmit light of the first wavelength and the second wavelength from the waveguide structure to the plurality of optical channels and In Example 2, the subject matter of Example 1 can optionally include that the first Q factor is equal or less than about $5 \times 10^4$, and the second Q factor is equal or more than about $5 \times 10^4$ In Example 3, the subject matter of Example 1 or 2 can optionally include that the optical output structure may be further configured to keep the waveguide structure substantially free from light from the optical channels.

In Example 4, the subject matter Example 3 can optionally include that the optical output structure may transmit less than 2% of the light transmitted into the plurality of optical channels back into the waveguide structure.

In Example 5, the subject matter of Example 1 to 4 can optionally include that the optical output structure may include a tap coupler optically coupled to the waveguide structure.

In Example 6, the subject matter of Example 1 to 5 can optionally include that the optical output structure may include at least a first optical output and a second optical output optically isolated from each other, wherein at last one of the first optical output and the second optical output is optically coupled to the plurality of optical channels.

In Example 7, the subject matter of Example 1 to 6 can optionally include that at least one of the first optical output and the second optical output is coupled to a controller configured to control the light source to set the wavelength of the light emitted into the optical channels.

In Example 8, the subject matter of Example 1 to 7 can optionally include that the optical output structure may include a waveguide structure having a ring structure.

In Example 9, the subject matter of Example 1 to 8 can optionally include that the optical output structure may include a partially reflecting mirror having a reflectivity for the first wavelength and the second wavelength that is equal or less than 99% of the incoming light.

In Example 10, the subject matter of Example 1 to 9 can optionally include that the waveguide structure may include at least a first mirror and the light source optically coupled through a first waveguide with each other to form the optical cavity.

In Example 11, the subject matter of Example 10 can optionally include that the waveguide structure further may include a second mirror optically coupled through a second waveguide with the light source to form the optical cavity.

In Example 12, the subject matter of Example 10 can optionally include that the light source may include a high reflective coating on a facet to back reflect light received in the light source from the waveguide structure.

In Example 13, the subject matter of Example 1 to 12 can optionally include that the light source is configured as a multi-wavelength laser.

In Example 14, the subject matter of Example 1 to 13 can optionally include that the light source is configured as a tunable laser.

In Example 15, the subject matter of Example 14 can optionally include a controller configured to control the tunable laser to emit light of one of the at least first wavelength and second wavelength.

In Example 16, the subject matter of Example 1 to 15 can optionally include that the light source is one of the group of a tunable distributed feedback laser, a DBR laser, a tunable sampled grating-distributed feedback laser, a sampled grating-DBR laser, a tunable ring laser, a tunable microring laser, a multi-wavelength FP laser in combination with a tunable optical filter, a multi-wavelength distributed feedback laser in combination with a tunable optical filter, DBR laser in combination with a tunable optical filter, and a multi-wavelength sampled grating-distributed feedback laser in combination with a tunable optical filter or a sampled grating-DBR laser in combination with a tunable optical filter.

In Example 17, the subject matter of Example 1 to 16 can optionally include that the light source may include a tunable optical filter configured to select one of the first wavelength and second wavelength.

In Example 18, the subject matter of Example 16 or 17 can optionally include that the tunable laser may include a tunable filter that may include at least one of a tunable Mach-Zehnder interferometer, a switchable Mach-Zehnder interferometer or Michelson interferometer, a tunable bandpass filter, a tunable ring filter or a switchable ring filter.

In Example 19, the subject matter of Example 17 or 18 can optionally include that the tunable optical filter is configured to attenuate light of at least one wavelength of the light source by an attenuation value of equal or more than about 0.5 dB.

In Example 20, the subject matter of Example 17 to 19 can optionally include that the tunable filter is configured to have an optical bandwidth greater than a mode spacing of the light source and/or waveguide structure.

In Example 21, the subject matter of Example 1 to 20 can optionally include that the light source is a sampled grating laser may include a phase shifting component.

In Example 22, the subject matter of Example 1 to 21 can optionally include that the light source is a sampled grating laser that is apodized or tapered with a sinc-function.

In Example 23, the subject matter of Example 1 to 22 can optionally include that the light source is configured for longitudinal mode selection for single-mode operation.

In Example 24, the subject matter of Example 1 to 22 can optionally include that the waveguide structure may include a ring-shaped waveguide configured to guide light of the first wavelength and the second wavelength.

In Example 25, the subject matter of Example 1 to 24 can optionally include that the waveguide structure may include a linear-shaped waveguide configured to guide light of the first wavelength and the second wavelength.

In Example 26, the subject matter of Example 1 to 25 can optionally include that an optical length of the waveguide structure is selected to achieve a predefined linewidth and/or a predefined optical feedback tolerance.

In Example 27, the subject matter of Example 1 to 26 can optionally include that the waveguide structure may include an optical length of equal or more than about 1 cm and a second Q factor of about $10^5$.

In Example 28, the subject matter of Example 1 to 27 can optionally include that the waveguide structure may include a Mach-Zehnder Interferometer, wherein the Mach-Zehnder Interferometer is configured in a Single-Drive configuration may include a single phase shifter.

In Example 29, the subject matter of Example 1 to 27 can optionally include that the waveguide structure may include a Mach-Zehnder Interferometer, wherein the Mach-Zehnder Interferometer is configured in a Dual-Drive configuration may include at least a first light path having a first phase shifter and a first output, and a second light path having a second phase shifter and a second output.

In Example 30, the subject matter of Example 1 to 29 can optionally include that the light transmitted into the plurality of optical channels through the optical output structure is a continuous wave and wherein the plurality of optical channels may include at least one optical chirp structure configured to chirp the light such that the light emitted to the outside may include a frequency chirp.

Example 31 is a photonic integrated circuit including a plurality of optical channels integrated on a semiconductor substrate, each optical channel configured to emit coherent light of a first wavelength and a second wavelength to the outside and to receive coherent light of the first wavelength and the second wavelength from the outside; a semiconductor light source integrated on the semiconductor substrate, the semiconductor light source configured to emit coherent light of at least the first wavelength and the second wavelength; an optical resonator for at least the light of the first wavelength and the second wavelength integrated on the semiconductor substrate, the optical resonator optically coupled to the semiconductor light source and having a higher Q factor than the semiconductor light source, the optical resonator coupled through an optical output structure with the plurality of optical channels to transmit light of the first wavelength and the second wavelength from the semiconductor light source to the plurality of optical channels.

In Example 32, the subject matter of Example 31 can optionally include that the optical output structure is configured optically tolerant to feedback (also denoted as back-reflection) or unidirectional and integrated on the semiconductor substrate.

The optical resonator may be formed or may include the waveguide structure of anyone of the Examples 1 to 30.

The photonic integrated circuit of Example 31 or 32 can optionally include any of the features of any one of the Examples 1 to 30.

Example 33 is a light detection and ranging system including a photonic integrated circuit of any one of Example 1 to 32, and an optical system (also denoted as I/O structure) configured to guide light from the photonic integrated circuit within an angular range to the outside of the light detection and ranging system. The optical system can optionally include one or more of a lens (system), a grating, a quarter wave plate, and a scanning mirror.

In Example 34, the subject matter of Example 33 can optionally include that the first wavelength and the second wavelength are part of a wavelength plan of the light detection and ranging system.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A photonic integrated circuit comprising a semiconductor substrate having integrated:
   a plurality of optical channels each configured to emit coherent light of a first wavelength and a second wavelength to the outside and to receive coherent light of the first wavelength and the second wavelength from the outside;
   a semiconductor light source configured to emit coherent light of at least the first wavelength and the second wavelength, the semiconductor light source having a first Q factor;
   a waveguide structure optically coupled to the semiconductor light source, the waveguide structure having a second Q factor that is higher than the first factor, the waveguide structure configured to form an optical cavity for at least the light of the first wavelength and the second wavelength;
   an optical output structure configured to optically couple the waveguide structure with the plurality of optical channels to transmit light of the first wavelength and the second wavelength from the waveguide structure to the plurality of optical channels.

2. The photonic integrated circuit of claim 1,
   wherein the first Q factor is equal to or less than about $5 \times 10^4$, and wherein the second Q factor is equal or more than about $5 \times 10^4$.

3. The photonic integrated circuit of claim 1,
   wherein the optical output structure is further configured to keep the waveguide structure substantially free from light from the optical channels.

4. The photonic integrated circuit of claim 3,
   wherein optical output structure transmits less than 2% of the light transmitted into the plurality of optical channels back into the waveguide structure.

5. The photonic integrated circuit of claim 1,
   wherein the optical output structure comprises a tap coupler optically coupled to the waveguide structure.

6. The photonic integrated circuit of claim 1,
   wherein the optical output structure comprises at least a first optical output and a second optical output optically isolated from each other, wherein at last one of the first optical output and the second optical output is optically coupled to the plurality of optical channels.

7. The photonic integrated circuit of claim 6,
   wherein at least one of the first optical output and the second optical output is coupled to a controller configured to control the light source to set the wavelength of the light emitted into the optical channels.

8. The photonic integrated circuit of claim 1,
   wherein the optical output structure comprises a waveguide structure having a ring structure.

9. The photonic integrated circuit of claim 1,
   wherein the light source comprises a high reflective coating on a facet to back reflect light received in the light source from the waveguide structure.

10. The photonic integrated circuit of claim 1,
    wherein the light source is configured as a multi-wavelength laser.

11. The photonic integrated circuit of claim 1,
    wherein the light source is configured as a tunable laser comprising a tunable filter that comprises at least one of a tunable Mach-Zehnder interferometer or Michelson interferometer, a switchable Mach-Zehnder interferometer or Michelson interferometer, a tunable bandpass filter, a tunable ring filter or a switchable ring filter.

12. The photonic integrated circuit of claim 11,
    wherein the tunable optical filter is configured to attenuate light of at least one wavelength of the light source by an attenuation value of equal or more than about 0.5 dB.

13. The photonic integrated circuit of claim 11,
    wherein the tunable filter is configured to have an optical bandwidth greater than a mode spacing of the light source and/or waveguide structure.

14. The photonic integrated circuit of claim 1,
    wherein the light source is a sampled grating laser that is apodized or tapered with a sinc-function.

15. The photonic integrated circuit of claim 1,
    wherein the waveguide structure comprises a linear-shaped waveguide configured to guide light of the first wavelength and the second wavelength.

16. The photonic integrated circuit of claim 1,
    wherein an optical length of the waveguide structure is selected to achieve a predefined linewidth and/or a predefined optical feedback tolerance.

17. The photonic integrated circuit of claim 1,
    wherein the waveguide structure comprises an optical length of equal or more than about 1 cm and a second Q factor of about $10^5$.

18. The photonic integrated circuit of claim 1,
    wherein the light transmitted into the plurality of optical channels through the optical output structure is a continuous wave and wherein the plurality of optical channels comprises at least one optical chirp structure configured to chirp the light such that the light emitted to the outside comprises a frequency chirp.

19. A light detection and ranging system comprising a photonic integrated circuit, the photonic integrated circuit comprising a semiconductor substrate having integrated:
    a plurality of optical channels each configured to emit coherent light of a first wavelength and a second wavelength to the outside and to receive coherent light of the first wavelength and the second wavelength from the outside;
    a semiconductor light source configured to emit coherent light of at least the first wavelength and the second wavelength, the semiconductor light source having a first Q factor;
    a waveguide structure optically coupled to the semiconductor light source, the waveguide structure having a second Q factor that is larger than the first factor, the waveguide structure configured to form an optical cavity for at least the light of the first wavelength and the second wavelength;

an optical output structure configured to optically couple the waveguide structure with the plurality of optical channels to transmit light of the first wavelength and the second wavelength from the waveguide structure to the plurality of optical channels, and;

the light detection and ranging system further comprising:

an optical system configured to guide light from the photonic integrated circuit within an angular range to the outside of the light detection and ranging system.

20. The light detection and ranging system of claim 19, wherein the optical output structure is configured to keep the waveguide structure substantially free from light from the optical channels.

21. The light detection and ranging system of claim 19, wherein the first wavelength and the second wavelength are part of a wavelength plan of the light detection and ranging system.

22. A photonic integrated circuit comprising:

a plurality of optical channels integrated on a semiconductor substrate, each optical channel configured to emit coherent light of a first wavelength and a second wavelength to the outside and to receive coherent light of the first wavelength and the second wavelength from the outside;

a semiconductor light source integrated on the semiconductor substrate, the semiconductor light source configured to emit coherent light of at least the first wavelength and the second wavelength;

an optical resonator for at least the light of the first wavelength and the second wavelength integrated on the semiconductor substrate, the optical resonator optically coupled to the semiconductor light source and having a higher Q factor than the semiconductor light source, the optical resonator coupled through an optical output structure with the plurality of optical channels to transmit light of the first wavelength and the second wavelength from the semiconductor light source to the plurality of optical channels.

23. The photonic integrated circuit of claim 22, wherein the optical output structure is configured optically unidirectional or tolerant to feedback and integrated on the semiconductor substrate.

* * * * *

UNITED STATES PATENT AND TRADEMARK OFFICE
CERTIFICATE OF CORRECTION

PATENT NO. : 12,248,174 B2  
APPLICATION NO. : 17/471218  
DATED : March 11, 2025  
INVENTOR(S) : William Hayenga et al.

Page 1 of 1

It is certified that error appears in the above-identified patent and that said Letters Patent is hereby corrected as shown below:

In the Claims

Claim 1, Column 17, Line 37: Replace "the first factor" with --the first Q factor--

Claim 19, Column 18, Line 68: Replace "the first factor" with --the first Q factor--

Signed and Sealed this  
Fifteenth Day of April, 2025

Coke Morgan Stewart  
*Acting Director of the United States Patent and Trademark Office*